(12) United States Patent
Ohkawa

(10) Patent No.: US 7,465,083 B2
(45) Date of Patent: Dec. 16, 2008

(54) FOCUSING PLATE, SURFACE LIGHT SOURCE DEVICE, AND IMAGE DISPLAY DEVICE

(75) Inventor: Shingo Ohkawa, Misato (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 10/548,318

(22) PCT Filed: Mar. 4, 2004

(86) PCT No.: PCT/JP2004/002741

§ 371 (c)(1),
(2), (4) Date: Sep. 7, 2005

(87) PCT Pub. No.: WO2004/079258

PCT Pub. Date: Sep. 16, 2004

(65) Prior Publication Data

US 2006/0171167 A1 Aug. 3, 2006

(30) Foreign Application Priority Data

Mar. 7, 2003 (JP) ............... 2003-061838
Oct. 15, 2003 (JP) ............... 2003-355045

(51) Int. Cl.
*F21V 7/00* (2006.01)
(52) U.S. Cl. ...................... 362/616; 362/620
(58) Field of Classification Search .......... 362/600–620
See application file for complete search history.

(56) References Cited

U.S. PATENT DOCUMENTS

| | | | | |
|---|---|---|---|---|
| 6,086,211 A | * | 7/2000 | Ohkawa | 362/620 |
| 6,231,200 B1 | * | 5/2001 | Shinohara et al. | 362/619 |
| 6,241,358 B1 | * | 6/2001 | Higuchi et al. | 362/613 |
| 6,364,497 B1 | | 4/2002 | Park et al. | |
| 6,412,968 B1 | | 7/2002 | Ohkawa | |
| 6,474,827 B2 | * | 11/2002 | Shinohara et al. | 362/607 |
| 2008/0232137 A1 | * | 9/2008 | Fukuda et al. | 362/620 |

FOREIGN PATENT DOCUMENTS

| | | |
|---|---|---|
| JP | 11-119219 | 4/1999 |
| JP | 11-212091 | 8/1999 |
| JP | 11-271765 | 10/1999 |
| JP | 2000-19330 | 1/2000 |
| JP | 2001-108835 | 4/2001 |
| JP | 2001-143512 | 5/2001 |
| JP | 2002-109935 | 4/2002 |
| JP | 2002-540557 | 11/2002 |
| JP | 2003-107465 | 4/2003 |
| JP | 2003-141918 | 5/2003 |

* cited by examiner

*Primary Examiner*—Anabel M Ton
(74) *Attorney, Agent, or Firm*—Staas & Halsey LLP

(57) ABSTRACT

An increased emission brightness provides a clear image display. Light from luminescent lamp 10 travels into light guide plate 2 through incidence face 3, being emitted from emission face 4 for irradiating LCD panel 5. Back face 7 of light guide plate 2 serves as light gathering function surfaces 14, 15 reflecting light as to gather the light around a normal direction of emission face 4 which provides an emission promotion surface having first and second slopes 17 and 18 for promoting the light introduce through incidence face 3, the first slopes 17 being configurated as to gently decrease thickness of light guide plate 2 with an increasing distance from incidence face 3 while second slopes 18 are configurated as to sharply increase thickness of light guide plate 2 with an increasing distance from thinner-plate-thickness-side end portions of slopes 17.

14 Claims, 23 Drawing Sheets

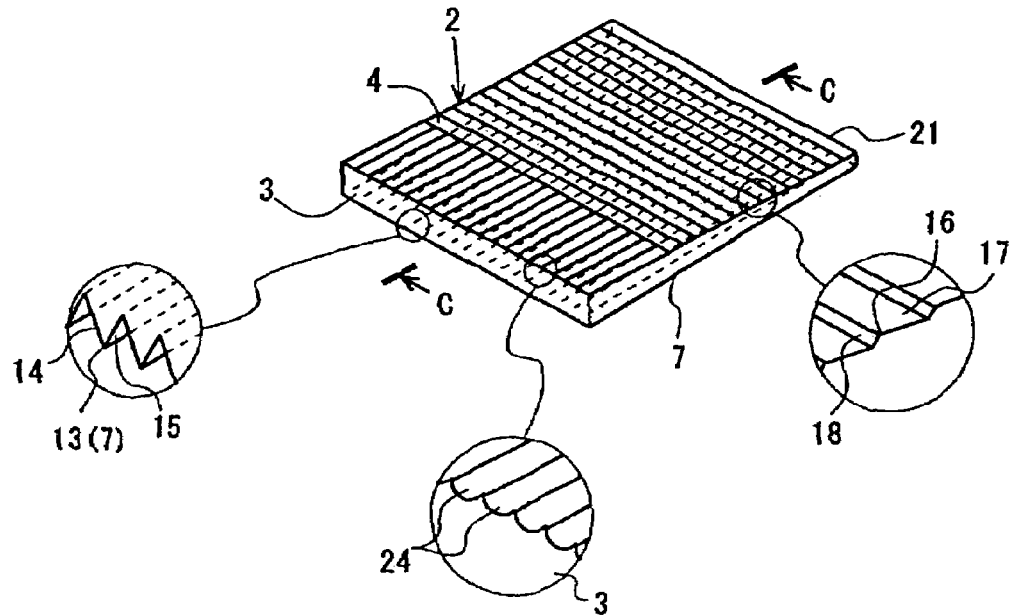
F I G. 1 4
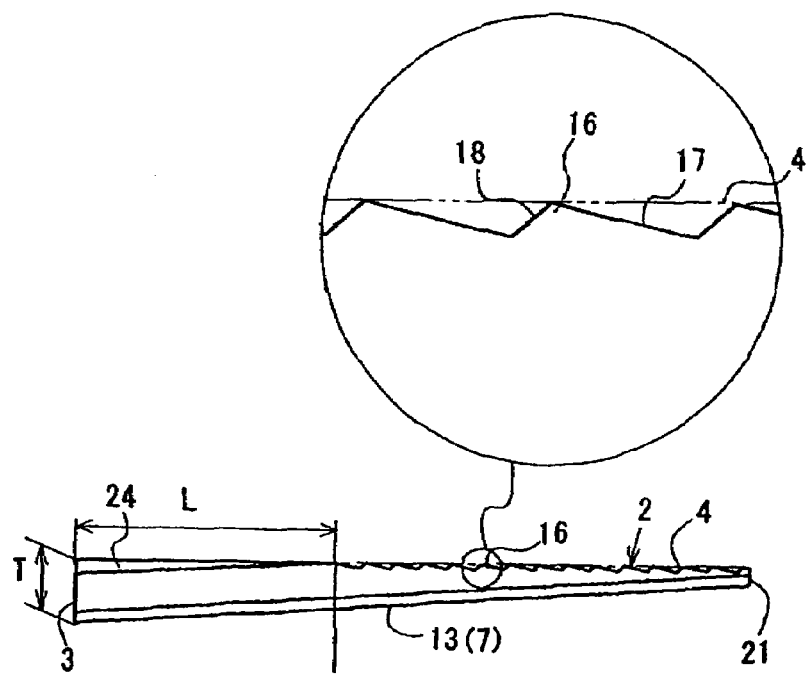
F I G. 1 5

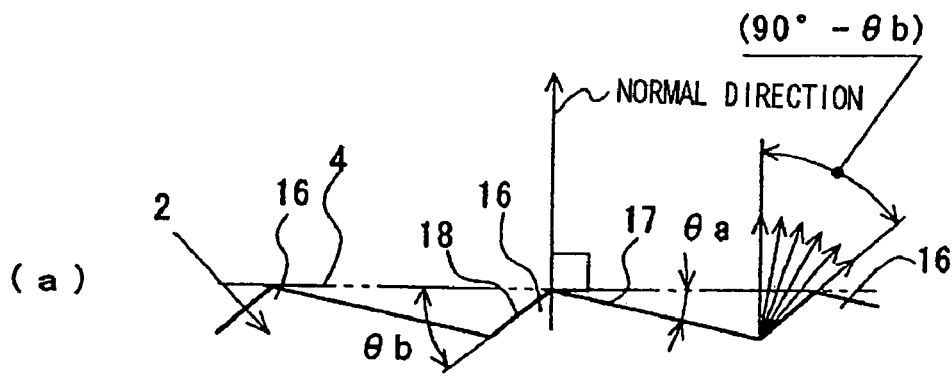
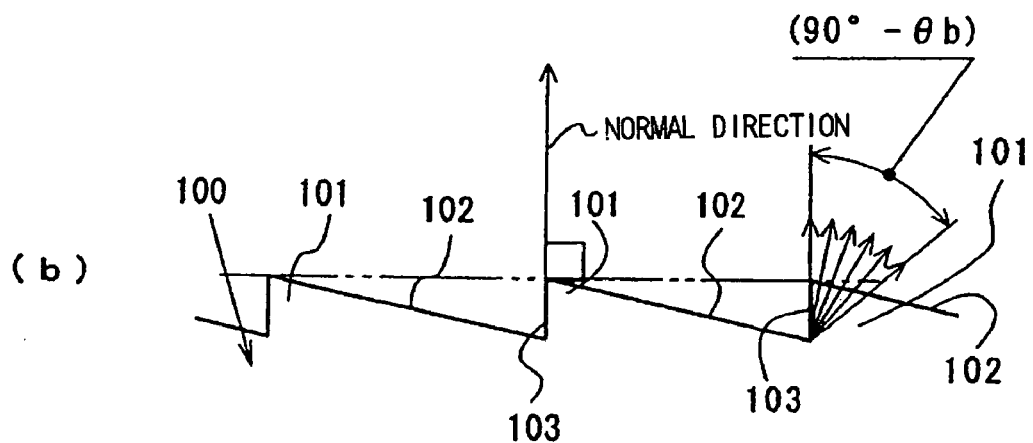
FIG. 20

(a)
$(\theta_B = \omega)$
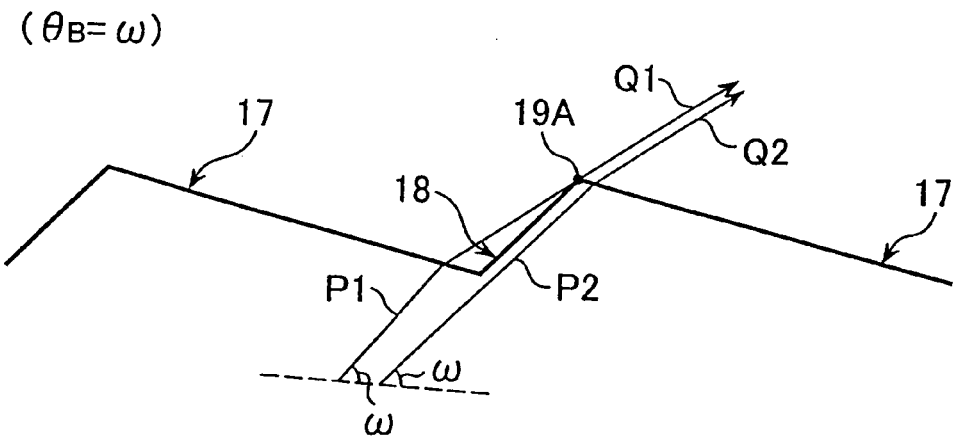
(b)
$(\theta_B > \omega)$
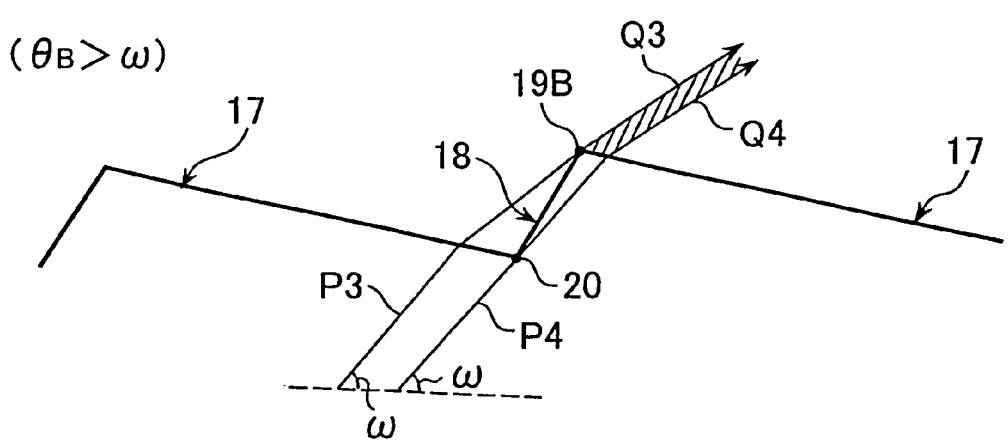
FIG. 25

FOCUSING PLATE, SURFACE LIGHT SOURCE DEVICE, AND IMAGE DISPLAY DEVICE

This application is based on and hereby claims priority to Japanese Patent Application Nos. 2003-061838 filed on Mar. 7, 2003 and 2003-355045 filed on Oct. 15, 2003, the contents of which are hereby incorporated by reference.

FIELD OF INVENTION

The present invention relates to a light guide plate applied to a surface light source device used for backlighting an image display panel (object-to-be-illuminated) and to the surface light source device, and further to an image display having an image display panel (object-to-be-illuminated) backlighted by the surface light source.

Light guide plates, surface light source devices and image displays may be applied to image displaying, for example, in portable telephones, portable mobile terminal devices, electronic dictionaries, various electronic devices or personal computers.

BACKGROUND

Liquid crystal displays have been broadly used as image displays applied to portable telephones, personal computes or the like. A known LCD (liquid crystal display) is equipped with a surface light source device for backlighting a LCD panel thereof. Usually, a surface light source device is provided with a light guide plate for taking in light from a light source and then direction-converting the light as to be outputted. Light traveling within the light guide plate after being taken therein involves a gradual emission from an emission face.

Surface light source devices of this type are disclosed in Tokkai 2001-108835 (Document 1) and Tokkai-Hei 11-119219 (Document 2).

A surface light source device shown in Document 1 has a light guide plate having a back face (a face opposite to an emission face) provided with first prismatic projections, arranged repeatedly, running parallel to an incidence face (incidence side end face) of the light guide plate. This intends to give a uniformalized brightness to the emission from the emission face of the light guide plate by contriving angles of reflection surfaces provide by the projections or repetition pitch of them.

In addition the emission face of the light guide plate of the surface light source device shown in Document 1 is provided with second prismatic projections, arranged repeatedly, running perpendicularly to the incidence face (incidence side end face) of the light guide plate. The second prismatic projections helps the emission to be gathered and have an increased brightness.

A surface light source device shown in Document 2 has a light guide plate which contains a light diffusible material dispersed therein and has a back face (a face opposite to an emission face) provided with a plurality of prismatic projections. These prismatic projections correct directivity of illumination light emitted from the emission face. In addition, the emission face is provided with light scattering pattern for promoting light-outputting and uniformalizing emission brightness.

However, the surface light source device disclosed in Document 1 hardly able to realize an efficiently high emission brightness (intensity) while emission brightness is uniformalized.

In the case of the surface light source device disclosed in Document 2 above, emission directivity corrected by the prismatic projections formed on the back face of the light guide plate is disturbed on light-outputting by light scattering caused on light-outputting by the light scattering pattern formed on the emission face of the light guide plate, although an effectively uniformalized brightness is obtained. As a result, a required emission intensity is hardly obtained.

In general, a light guide plate has a back face inclined so that plate thickness is decreasing from an incidence side end face to an opposite end side face, providing a wedge-like cross section. Therefore, light traveling within the light guide plate has an inner-incidence angle getting smaller with an increasing distance from the incidence side end face. This gives the light guide plate characteristics such that light-outputting from the emission face tends to get easier with an increasing distance from the incidence side end face. Accordingly, it has been desired to improve structure of light guide plate so that high and uniform brightness is realized under consideration of the above characteristics.

DISCLOSURE OF INVENTION

Under the above background, an object of the present invention is to improve structure of an emission face and back face of a light guide plate in a surface light source device so that the light guide plate is able to provide a more higher illumination brightness.

Another object of the present invention is to provide a surface light source device and image display improved by employing the same light guide plate.

First, the present invention is applied to a light guide plate provided with an incidence side end face (i.e. a side end face near to a light source supplying light to the light guide plate; in the same way, hereafter), a distal side face located oppositely to the incidence side end face, an emission face outputting light inputted from the incidence side end face and a back face located oppositely to the emission face, allowing the light inputted from the incidence side end face to be outputted from said emission face during traveling.

According to a feature of the present invention, at least a part of said emission face provides an emission promotion surface which has a plurality of first slopes and a plurality of second slopes, said first slopes being arranged repeatedly at intervals along a direction from said incidence side end face towards said distal side face.

On the other hand, said second slopes are arranged as to fill up the intervals respectively. In addition, each of said first slopes is inclined as to have a normal leaning to the distal side face.

Further, each of said second slopes is inclined as to have a normal leaning to the incidence side end face and to be steeper than adjacent first slopes on both sides thereof.

Inclination angles of said fist slopes may get smaller with an increasing distance from said incidence side end face.

Inclination angles of said second slopes are preferably defined so that light outputted toward a main direction of emission from said emission face avoids from being incident to said second slopes.

The present invention is applied to a light guide plate provided with an incidence side end face, a distal side face located oppositely to the incidence side end face, an emission face outputting light inputted from the incidence side end face and a back face located oppositely to the emission face, allowing the light inputted from the incidence side end face to be outputted from the emission face during traveling.

According to a feature of the present invention, said back face provides a light gathering function surface which inner-reflects light as to gather the light around a normal direction of said emission face and said emission face has emission promotion areas arranged repeatedly along a direction from said incidence side end face towards said distal side face.

Said emission promotion areas have first and second slopes, respectively. Said first slopes are arranged repeatedly at intervals along a direction from said incidence side end face towards said distal side face and further being configurated as to give a gently decreasing thickness to the light guide plate with an increasing distance from said incidence side end face.

Said second slopes are arranged as to fill up the intervals respectively and further being configurated as to give a sharply increasing thickness to the light guide plate with an increasing distance from said incidence side end face.

It is also preferable in this case that inclination angles of said second slopes are defined so that light outputted toward a main direction of emission from said emission face avoids from being incident to said second slopes.

Inclination angles of said fist slopes may get smaller with an increasing distance from said incidence side end face. Said emission promotion areas may cover over said emission face, or said emission promotion areas may be formed within a predetermined range extending from said incidence side end face.

Further, when said emission promotion areas are formed within a predetermined range extending from said incidence side end face, prismatic grooves extending in a direction generally perpendicular said incidence side end face may be formed repeatedly along said incidence side end face.

Said light gathering function surface preferably has a light gathering function which decreases with a decreasing distance from said incidence side end face within a neighbour of said incidence side end face.

A light guide plate in accordance with the present invention is capable of not only increasing emission brightness but also avoiding directivity from being disturbed by light scattering because an emission promotion surface provided with repeated gentle-steep slopes are formed on an emission face. Specifically, when a light gathering function surface is provided by a back face, the light gathering function is not spoiled. As a result, further heightened brightness is realized.

In addition to heightening of emission efficiency from the emission face, uniformalizing of brightness is realized easily. A surface light source device employing a light guide plate in accordance with the present invention is able to output a bright illumination light effectively directed to a desired direction. Further saying, if "desired direction" is changed, design modification for adjusting to such a change is easily performed by modifying inclination angles of the first or second slopes.

Accordingly, if the above improved surface light source device is applied to an image display of a type such that an image display portion is illuminated, a clear image comfortably viewed from a desired direction can be displayed easily.

BRIEF DESCRIPTION OF DRAWINGS

FIG. 14 is perspective view of an outward appearance of a light guide plate of a third embodiment in accordance with the present invention.

FIG. 15 is a cross section view along C-C in FIG. 14.

FIGS. 16a and 16b are views for illustrating detailed configuration of a light guide plate of a third embodiment in accordance with the present invention, FIG. 16a giving a plan view of the instant light guide plate and FIG. 16b giving a cross section view along E-E in FIG. 16a;

FIGS. 18a and 18b are views illustrating detailed configuration of a light guide plate of a forth embodiment in accordance with the present invention, FIG. 18a giving a plan view of the instant light guide plate and FIG. 18b giving a cross section view along F-F in FIG. 17a;

FIG. 20a is an enlarged partial view of an emission face of the light guide plate employed in the first embodiment in accordance with the present invention for describing an emission promotion function of projections on the light guide plate, and FIG. 20b is an enlarged partial view of an emission face of a light guide plate disclosed in the foresaid document;

FIGS. 21a and 21b are views illustrating a light guide plate of a fifth embodiment in accordance with the present invention, FIG. 21a giving a plan view of the instant light guide plate and FIG. 21b giving a cross section view along G-G in FIG. 21a;

FIG. 25 gives illustrations for explaining reasons why dark parts appear around boundaries between first and second slopes, FIG. 25a illustrating behaviour of a main light beam under a condition such that angle θB is equal to angle ω and FIG. 25b illustrating that under another condition such that angle θB is greater than angle ω;

BEST EMBODIMENTS OF INVENTION

First Embodiment

Figure 1:
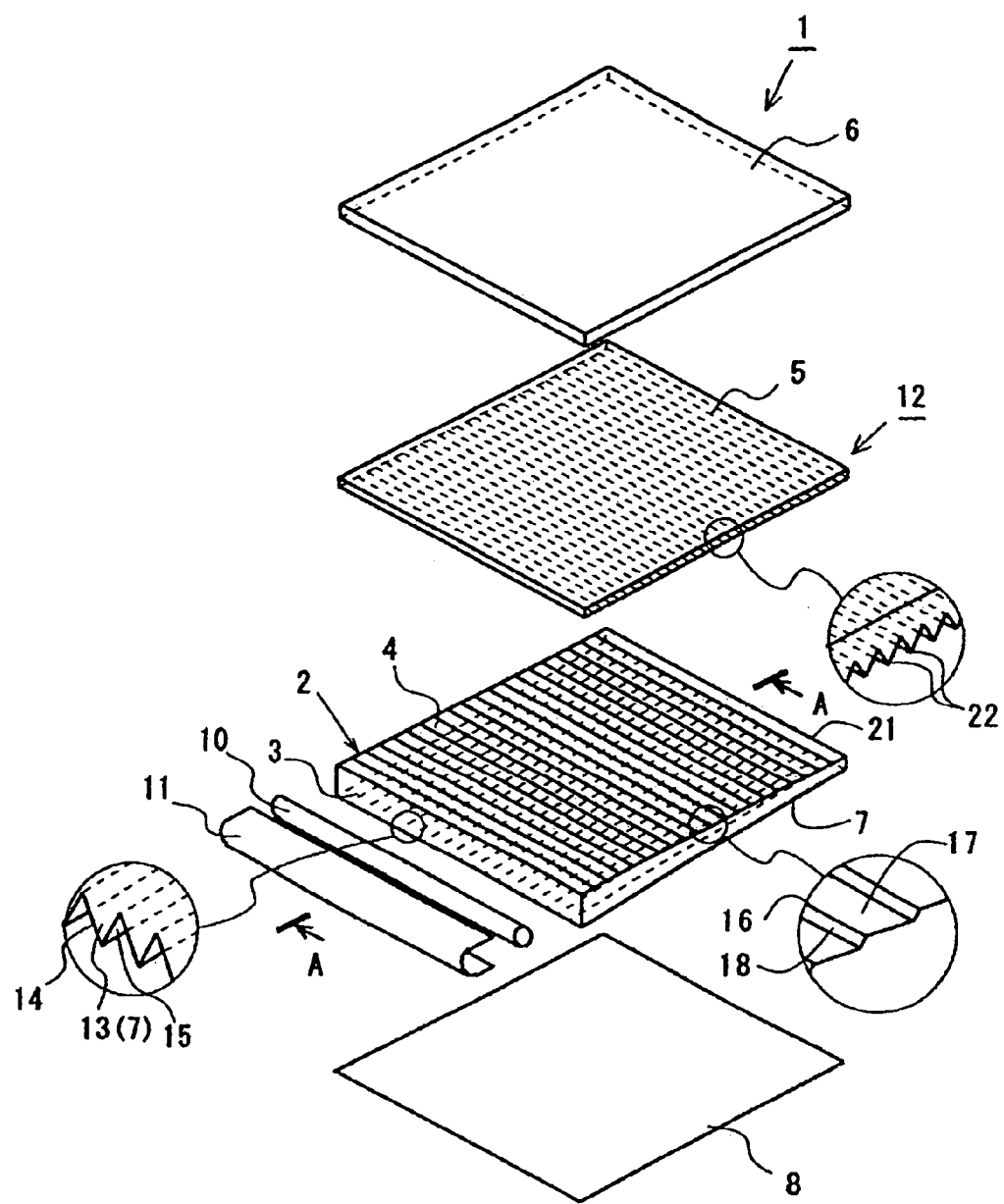
FIG. 1 is an exploded perspective view of a LCD of a first embodiment in accordance with the present invention.
Figure 2:
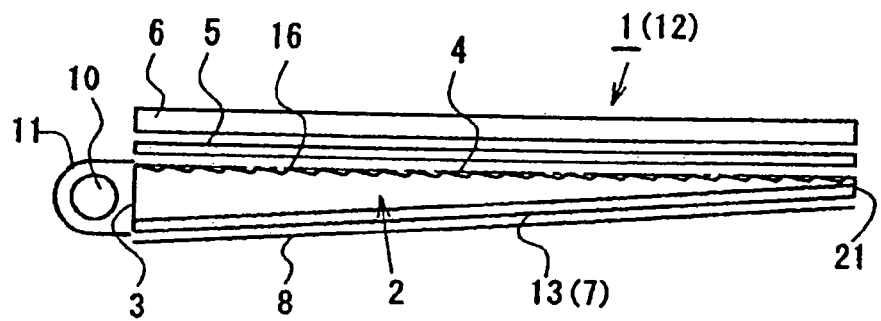
FIG. 2 is a cross section view along A-A in FIG. 1.
Figure 3:
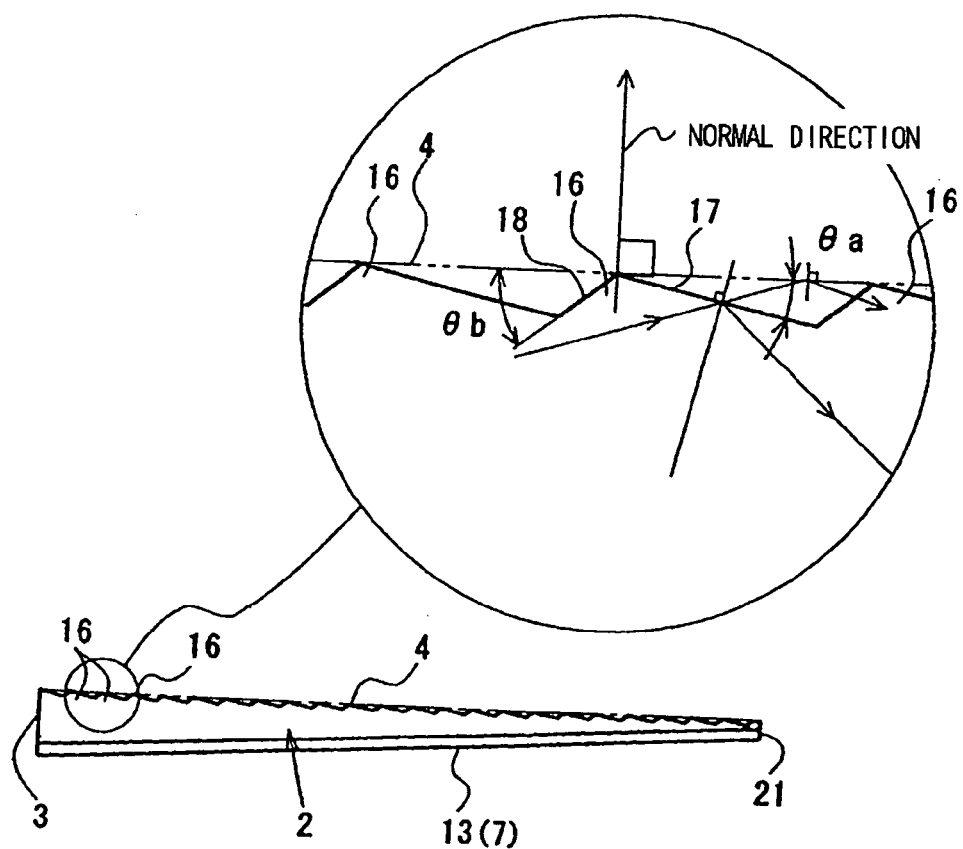
FIG. 3 is a cross section view of a light guide plate employed in the first embodiment.

FIGS. 1 to 3 illustrate LCD 1 as an image display of a first embodiment in accordance with the present invention. FIG. 1 is a perspective view of a LCD of the LCD 1, FIG. 2 is a cross section view of a cross section (along line A-A) perpendicular to incidence side end face 3 of light guide plate 2, and FIG. 3 shows a cross section view of light guide plate 2 employed in the first embodiment, illustrating a configuration of an emission face of light guide plate 2.

(Outlined Structure of LCD)

Referring to these illustrations, LCD 1 includes light guide plate 2, light control member (prism sheet) 5 disposed along emission face 4 of light guide plate 2, LCD panel (image display section) 6 and reflection member 8 disposed along back face (a face opposite to emission face 4) 7 of light guide plate 2.

Fluorescent lamp 10 as a light source is disposed as to be opposite to incidence side end face 3 provided by a side end face (on the light incidence side) to which light is supplied, being surrounded by reflector 11. Light guide plate 2, prism sheet 5, reflection member 8, fluorescent lamp 10 and reflector 11 compose surface light source device 12.

Surface light source device 12 backlights LCD panel 6. It is noted that LED (Light Emitting Diode) or light sources of other types may be used instead of fluorescent lamp 10.

(Light Guide Plate)

Light guide plate 2 is made of a well light-permeable material such as polycarbonate (PC), polymethyl methacrylate (PMMA) or cycloolefin-type resin. An emission face is generally rectangular. Back face 7 is inclined and plate thickness gets reduced with an increasing distance from fluorescent lamp 10, giving light guide plate 2 a wedge-like cross section.

Back face 7 is provided with prismatic projections 13 which run generally perpendicularly to incidence face 3 and are formed successively along a direction parallel to incidence face 3. Prismatic projections 13 have triangle-like cross sections parallel to incidence face 3.

Slopes 14 and 15 formed as to extend from top of triangle-like cross section and get remote from each other, functioning as a light gathering function surface. That is, slopes 14 and 15 inner-reflect a remarkable part of the light travelling within light guide plate 2 as to gather light around a normal direction of emission face 4 in a plane parallel to incidence face 3.

On the other hand, emission face 4 is provided with a plurality of projections 16 which run generally parallel to incidence face 3 and are formed successively along a direction perpendicular to incidence face 3. Projections 16 have triangle-like cross sections generally vertical to incidence face 3. Each triangle-like cross section is formed of first slope 17 and second slope 18.

First slopes 17 are arranged at intervals, being configurated as to give a gently decreasing plate-thickness with an increasing distance from incidence face 3. Then second slopes 18 are inclined sharply and inversely as compared with first slopes 17, being arranged as to fill the intervals, respectively.

First slopes 17 cause some of the light travelling within light guide plate 2 toward a direction leaving incidence face 3 to be emitted, inner-reflecting some of the light travelling within light guide plate 2. As shown in FIG. 3, inner-reflection occurs at an angle twice $\theta a$, namely $2\theta a$, larger than an angle in an imaginary case where no inclination is formed on emission face 4, wherein $\theta a$ is an inclination angle thereof.

Accordingly, an incidence angle of light which is reflected by back face after being reflected by any first slope 17 and then inner-impinges on another first slope 17 is smaller than that of light which is inner-impinges on emission face 4 via a similar path in the imaginary case where no inclination is formed on emission face 4.

Therefore, light emission occurs more easily as compared with the imaginary case provided with no inclination. In other words, first slopes 17 function as emission promoting surfaces.

In addition, under a constant pitch between projections 16, 16, the larger inclination angle $\theta b$ is, the larger an area occupation ratio of first slopes 17 on emission face 4 becomes, with the result ratio of first slopes 17 show an increased emission promoting function.

It is noted that second slopes 18 function as emission promoting surfaces for light (called "returning light", hereafter) that returns toward incidence face 3 after being reflected by an end face (distal end face) 21 opposite to incidence face 3 if inclination angle $\theta b$ is set suitably. FIG. 20a shows for projections 16 that second slopes 18 are inclined at $\theta b$ with respect to emission face 4.

This prevents light emitted from first slope 17 at an angle within a range from a normal direction to $90°-\theta b$ (i.e. $0\leq\theta\leq90°-\theta b$) from entering again into light guide plate 2.

To the contrary, in the case of the art disclosed in the foresaid Document 1, if light guide plate 100 is used in an upsidedown arrangement as shown in FIG. 20b, light emitted from slope 102 at an angle within a range $0\leq\theta\leq90°-\theta b$ is allowed to enter again into light guide plate 100 through normal direction rising face 103 because projection 101 is composed of slope 102 and normal direction rising face 103.

Occasionally, this re-entering light is reflected by slope 102, failing to be used effectively for illumination. Projections 16 employed in the embodiment can avoid such re-entering.

Therefore, comparing light guide plate 2 of the embodiment with light guide plate 100 of Document 1, light guide plate 2 of the embodiment can utilize a larger part of emission light for illumination as compared with light guide plate 100 of Document 1, being advantageous for increasing emission brightness.

The above inclination angle $\theta a$ of first slopes 17 falls preferably within a range from 0.1° to 5°, typically being about 1°.

The above inclination angle $\theta b$ of second slopes 18 falls preferably within a range from 10° to 90°, typically being about 45°.

An inner-travelling light of light guide plate 2 as described above proceeds toward distal end face 21, involving repeated inner-reflections by emission face 4 and back face 7. On the way of this inner-travelling, light that is inner-incident to first slope 17 at an incidence angle smaller that the critical angle escapes from light guide plate 2.

Attention is to be paid to an important fact that inner-incidence to first slope 17 can be smaller than the critical angle more easily as compared with the imaginary case emission face 4 has no slope (i.e. θ=0°) because back face 7 is inclined as to get closer to emission face 4 (See FIG. 3). This brings a much promoted emission. In addition, light reflected by back face 7 is gathered around a normal direction of emission face 4 by prismatic projections 13 in a plane parallel to incidence face 3 and such directivity is not disturbed by being emitted from emission face 17.

This makes emission promotion more advantageous as compared with that by light scattering pattern of prior arts.

Some of returning light produced by reflection at distal end face 21 is incident to second slope 18 at an incidence angle smaller than the critical angle, being emitted toward the outside. This emission also avoids directivity of light gathered by prismatic projections 13 on back face 7 from being disturbed. Light guide plate 2 with such merits enables illumination light to have an increased brightness.

(Light Control Member)

Prism sheet 5 is a light control member provided with a plurality of fine prismatic projections 22 running in parallel with each other, being made of a well light-permeable resin material (such as PET, PMMA or PC). Its size and shape correspond generally to those of emission face 4 of light guide plate 2.

Prism sheet 5 is disposed along emission face 4, being orientated so that prismatic projections 13 run perpendicularly to prismatic projections 22. Prismatic projections 22 have triangle-like cross sections, basic functions of which are well known.

Figure 4:
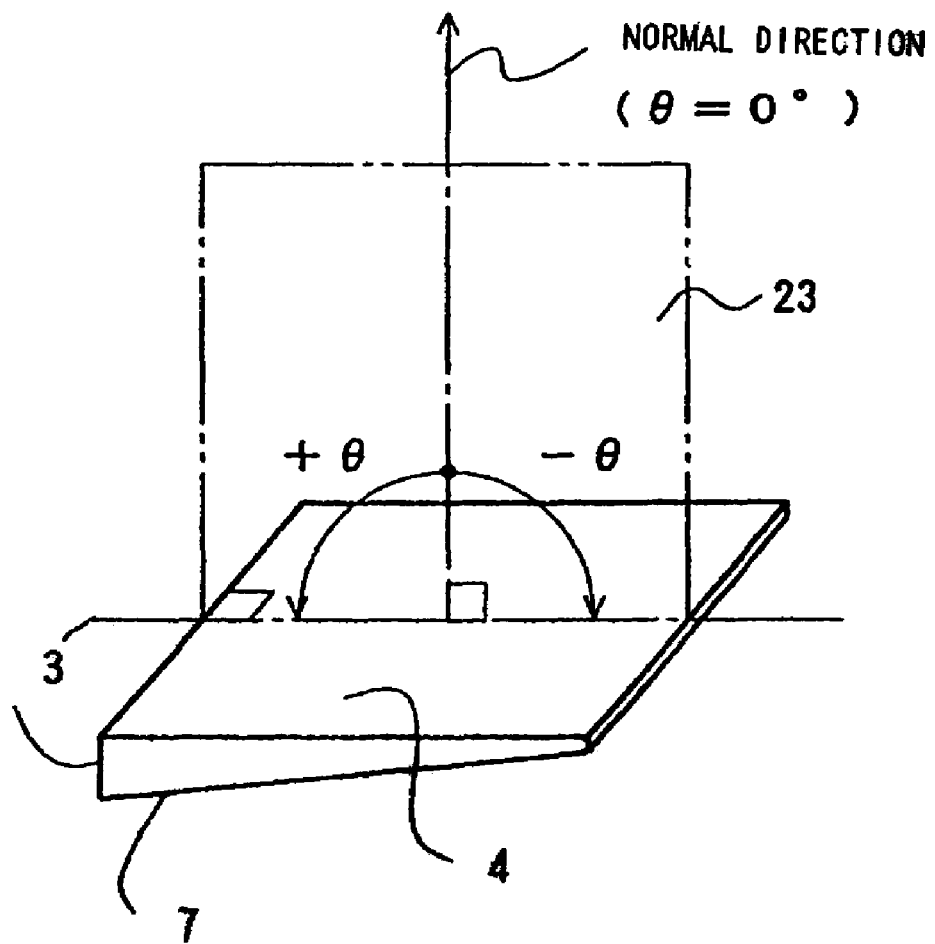
FIG. 4 is a perspective view of an outward appearance of the light guide plate used for describing emission characteristics.

That is, according to the functions, emission light from emission face 4 is redirected as to be deflect to around a normal direction of emission face 4 in an imaginary plane 23 perpendicular to both incidence face 3 and emission face 4 (See FIG. 4). As a result, an object to be irradiated (such as LCD panel 6 shown here) is illuminate effectively.

Figure 5:
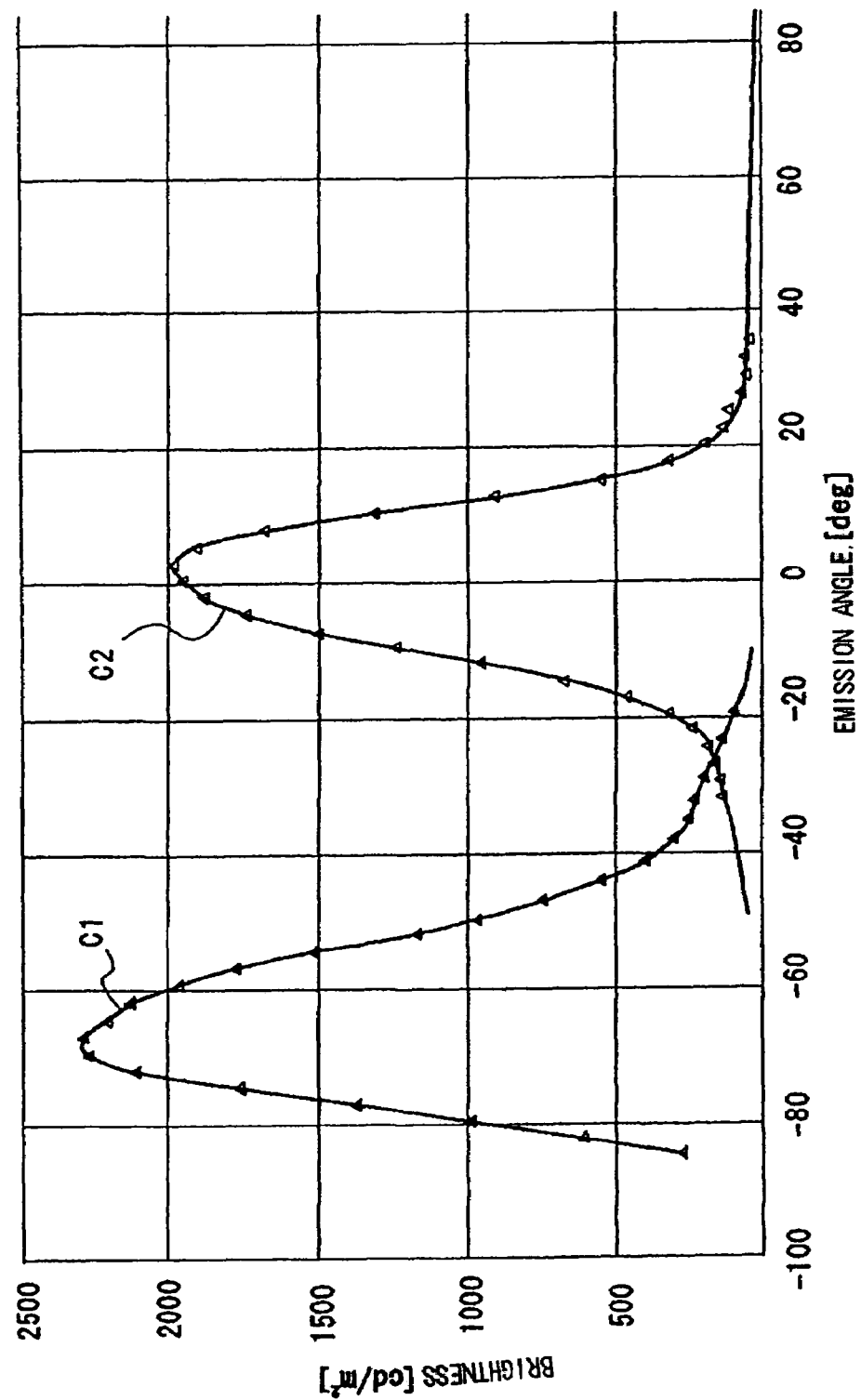
FIG. 5 is a diagram illustrating emission characteristics of the light guide plate and light control member.

FIG. 5 is a diagram illustrating characteristics (C1) of emission from first slopes 17 (emission face 4) of light guide plate 2 together with characteristics (C2) of emission from prism sheet 5 for comparison.

Referring to FIG. 5, emission angle of 0 degree corresponds to a normal direction of imaginary plane 23 in FIG. 4. It is noted that rotation angle is defined in FIG. 4 so that a deviation to the right-hand direction from the normal direction of imaginary plane 23 gives a negative increase and a deviation to the left-hand direction from the normal direction of imaginary plane 23 gives a positive increase.

As illustrated in FIGS. 4 and 5, an emission direction from first slopes 17 (emission face 4) is a direction of −70°, and a main travelling direction is converted roughly into the normal direction after transmitting prism sheet 5.

(Reflection Member)

Reflection member 8 is well known member, being formed of a well-reflective PET sheet to which white pigment is added, a film on which well-reflective metal such as aluminum is applied by vapour-evaporation, or the like. Its size and shape correspond generally to those of back face 7 of light guide plate 2. Reflection member 8 functions as to reflect and return light, which leaks from back face 7, to light guide plate 2. It is noted that reflection member 8 may be omitted. If so done, a housing (not shown) which accommodates light guide plate 2 has preferably an reflective inner surface (white surface).

(Results of Effect Measurement of Emission Promotion Surface)

Figure 6:
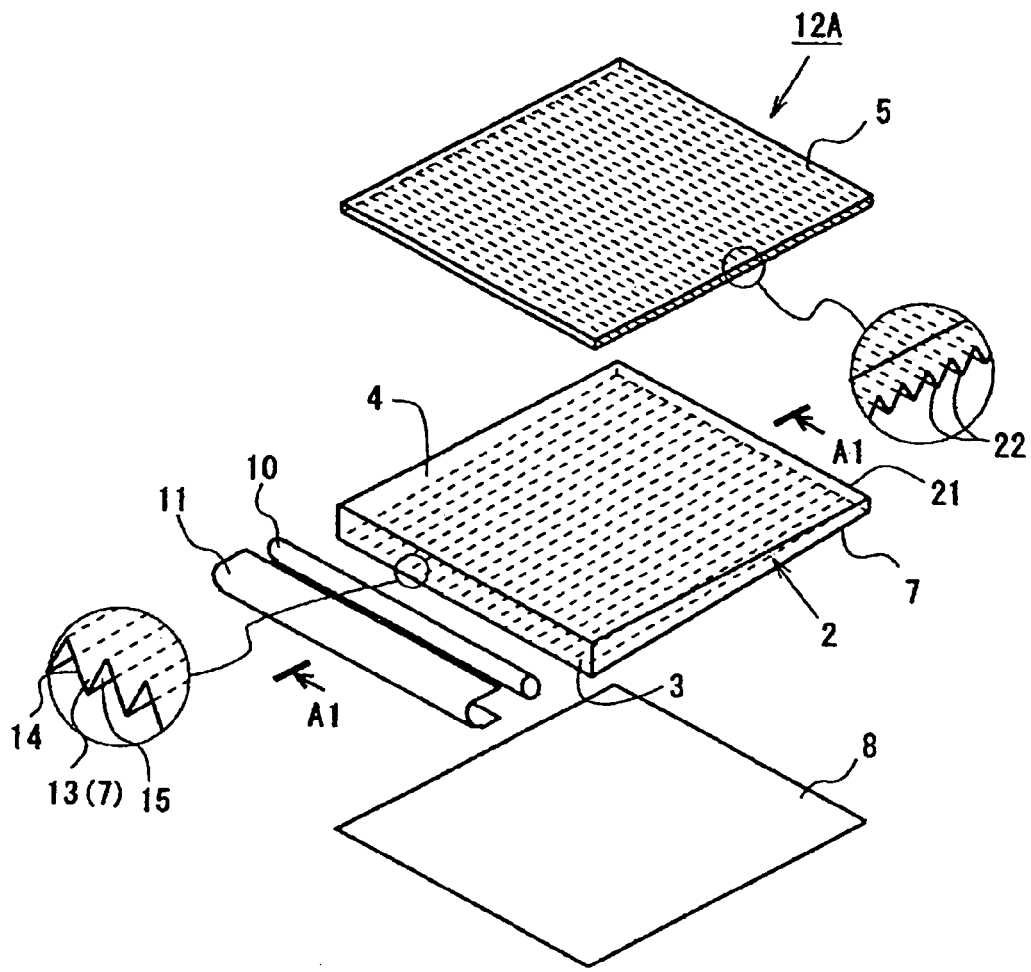
FIG. 6 is an exploded perspective view of a comparison-example of surface light source device.
Figure 7:
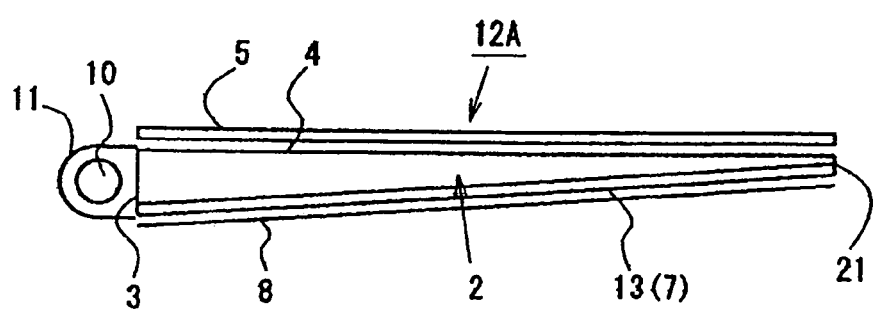
FIG. 7 is a cross section view along A1-A1 in FIG. 6.

FIGS. 6 and 7 show surface light source device 12-A (called simply "Comparison Example") to be compared with surface light source device 12 of the embodiment. This Comparison Example is has the same structure as that of surface light source device 12 except employing light guide plate 2 having a flat emission face 4 without projection 16.

Therefore, if an emission brightness distribution of light emitted from prism sheet 5 of surface light source device 12 is compared with that of light emitted from prism sheet 5 of Comparison Example 12A, effect of brightness improvement of the embodiment can be proved. It is noted that a LED was used instead of fluorescent lamp 10 in comparing of both brightness distributions.

FIGS. 8 to 11 show brightness distributions in cases a LED was used as light source.

Figure 8:
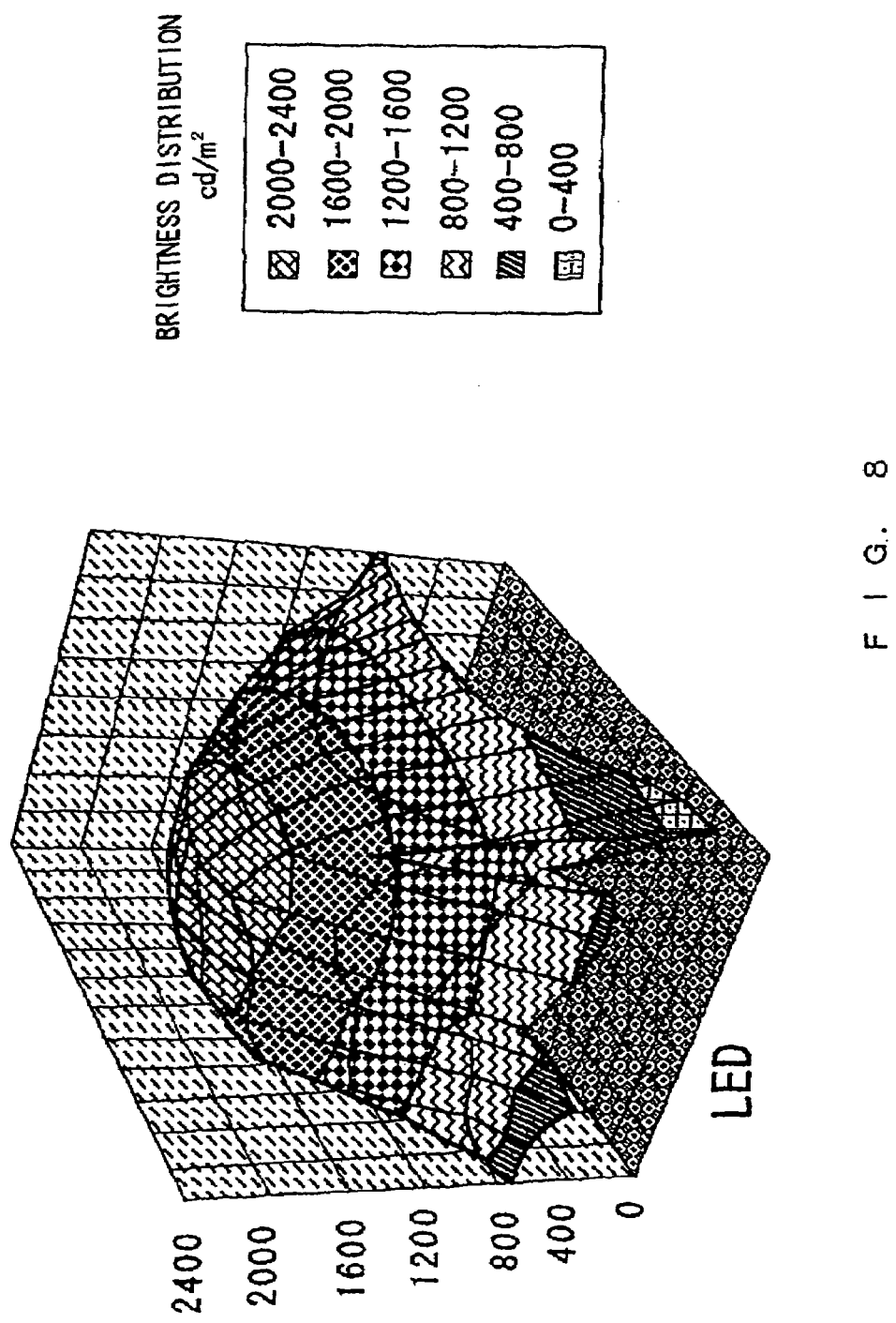
FIG. 8 is a diagram illustrating three-dimensionally a first example of brightness measurement of the surface light source device in accordance with the present invention.
Figure 9:
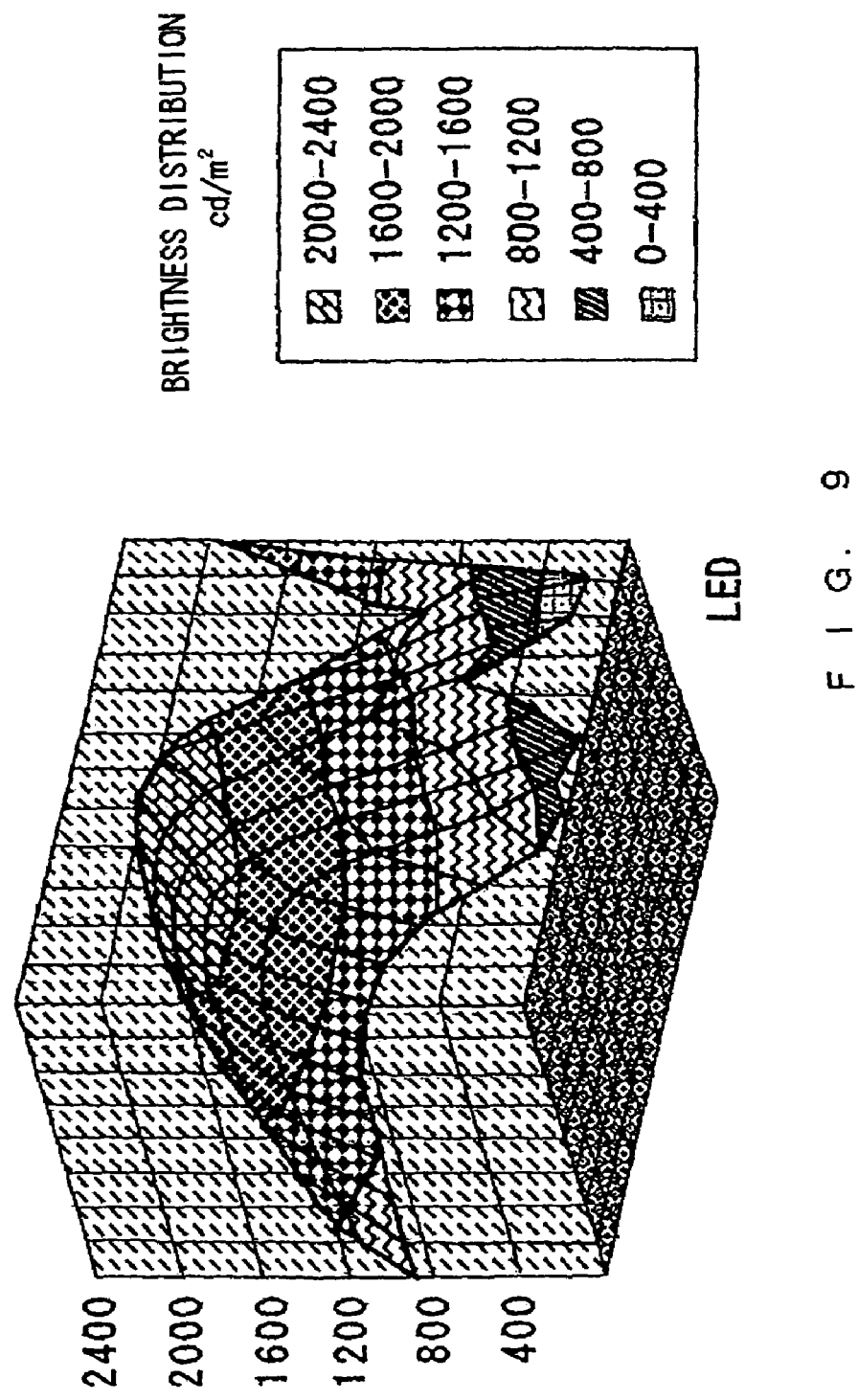
FIG. 9 is a diagram illustrating three-dimensionally, from another angle for comparison, a second example of brightness measurement of the surface light source device in accordance with the present invention.

FIGS. 8 and 9 illustrate an emission brightness distribution of surface light source device 12. In FIG. 8, Example 1 illustrates three-dimensionally measurement results of emission brightness in each of many areas defined by dividing an emission surface of prism sheet 5.

In FIG. 9, Example 2 illustrates measurement results three-dimensionally from a direction different from that of Example 1.

Figure 10:
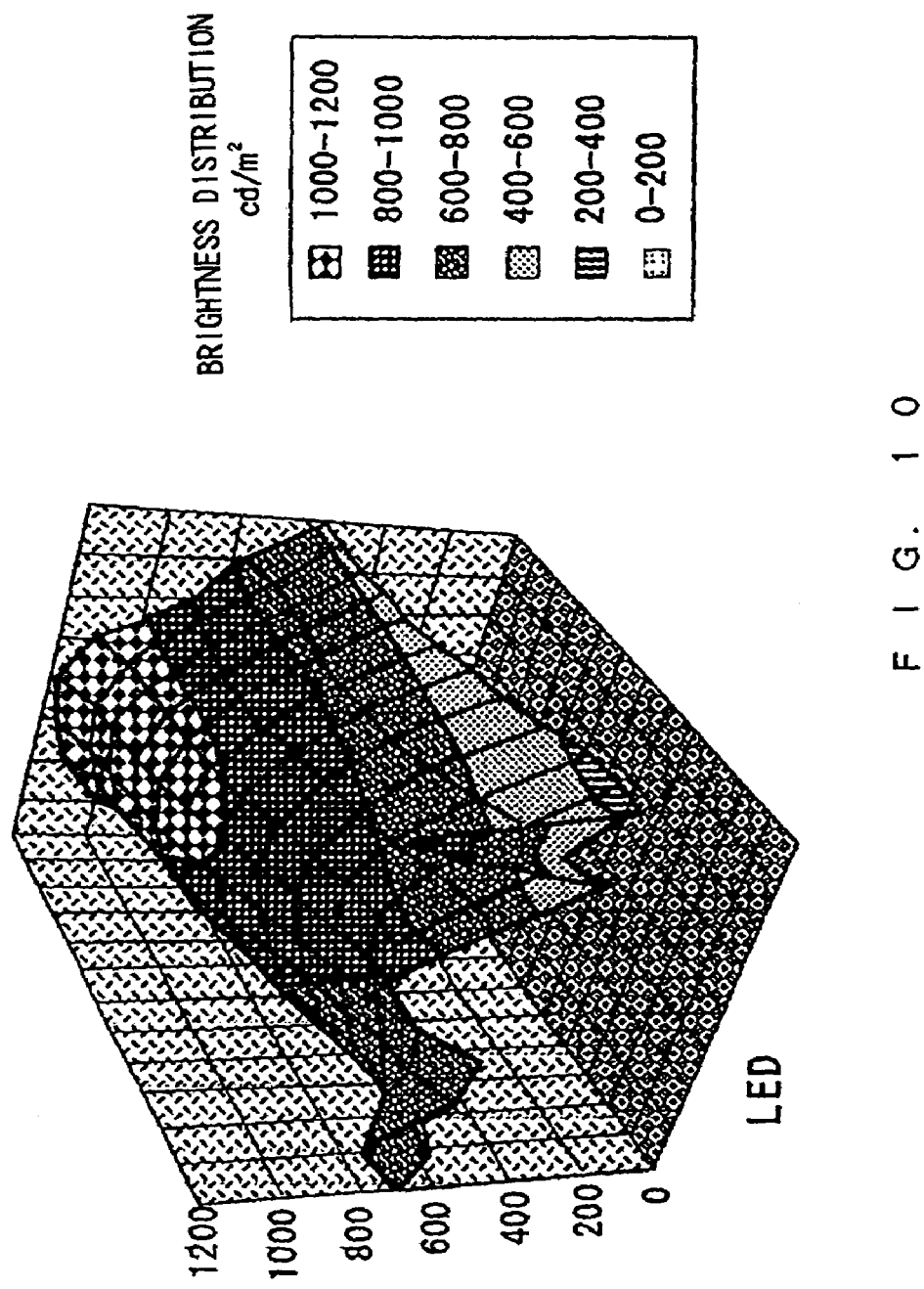
FIG. 10 is a diagram illustrating three-dimensionally a first example of a brightness measurement result of the comparison-example.
Figure 11:
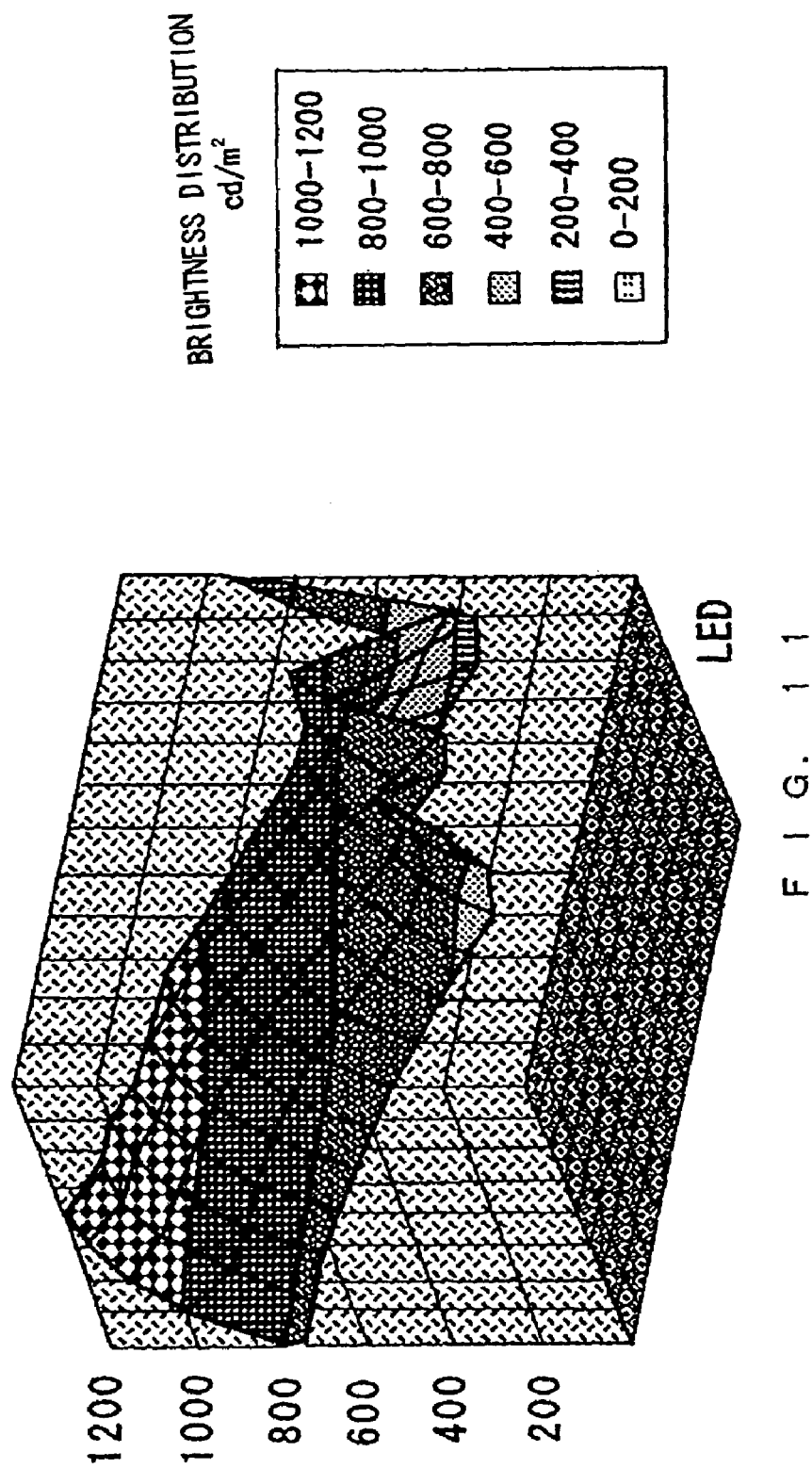
FIG. 11 is a diagram illustrating three-dimensionally, from another angle for comparison, a second example of brightness, measurement of the comparison-example.

On the other hand, FIGS. 10 and 11 illustrate an emission brightness distribution of Comparison Example 12-A. FIG. 10 illustrates three-dimensionally measurement results of emission brightness in each of many areas defined by dividing an emission surface of prism sheet 5 of Comparison Example 12-A (Example 1 in Comparison Example).

FIG. 11 illustrates measurement results of emission brightness three-dimensionally from a direction different from that of Example 1 shown in FIG. 10 (Example 2 in Comparison Example).

It is noted that first slope 17 of projection 16 has an inclination angle θa of about 1° and second slope 18 has an inclination angle θb of about 45°.

These measurement results tell that surface light source device 12 of the embodiment has an emission brightness at roughly a center of emission face 4 (center brightness) which is 2.2 times center brightness of Comparison Example 12-A.

In addition, average emission brightness is increased to 1.8 times that of Comparison Example 12-A. Needless to say, such a remarkable improvement in performance is mainly brought by to an emission promotion surface (projections 16 composed of first and second slopes 17, 18) on emission face 4 of light guide plate 2.

Surface light source device 12 and LCD 1 which employ light guide plate 2 emitting highly bright illumination light as described above realize brighter and clearer image displaying as compared with prior arts because they can irradiate image display portion (LCD panel 6) effectively.

Demerits of emission promotion by light scattering pattern of a light guide plate like that shown in Document 2 are removed.

That is, while the light guide plate shown in Document 2 requires an increased density of light scattering pattern for increasing emission promotion, with the result loss of light failing to be utilized effectively rather increases, the embodiment is free from such loss because of emission promotion is achieved without relying on light scattering.

Second Embodiment

Figure 12:
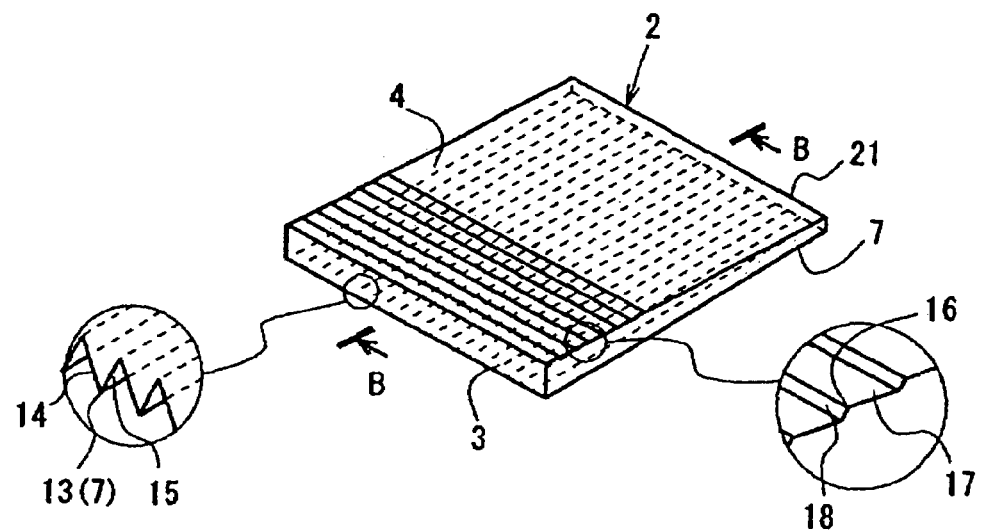
FIG. 12 is perspective view of an outward appearance of a light guide plate of a second embodiment in accordance with the present invention.
Figure 13:
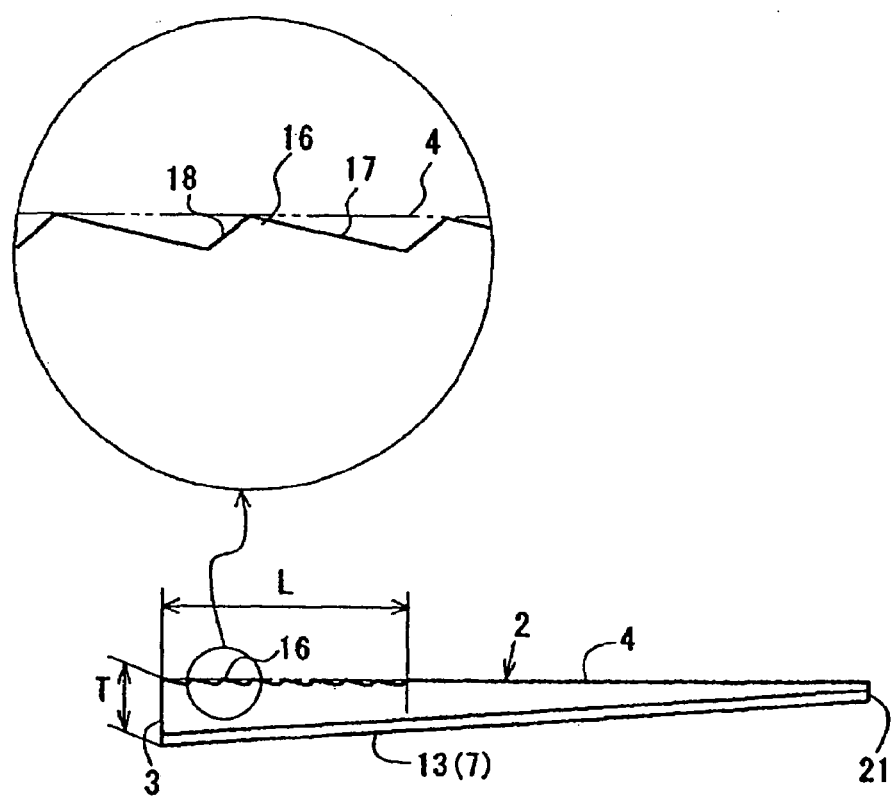
FIG. 13 is a cross section view along B-B in FIG. 2.
Figure 16:
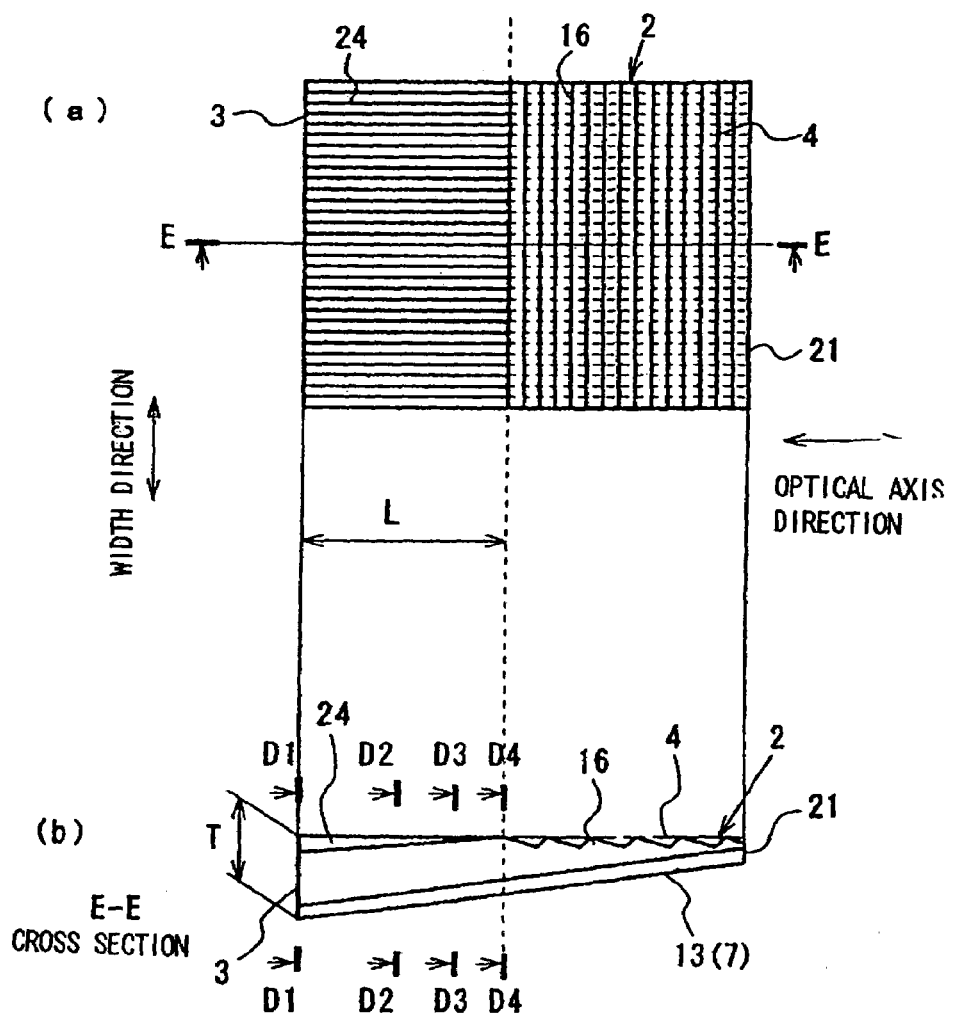
Figure 17:
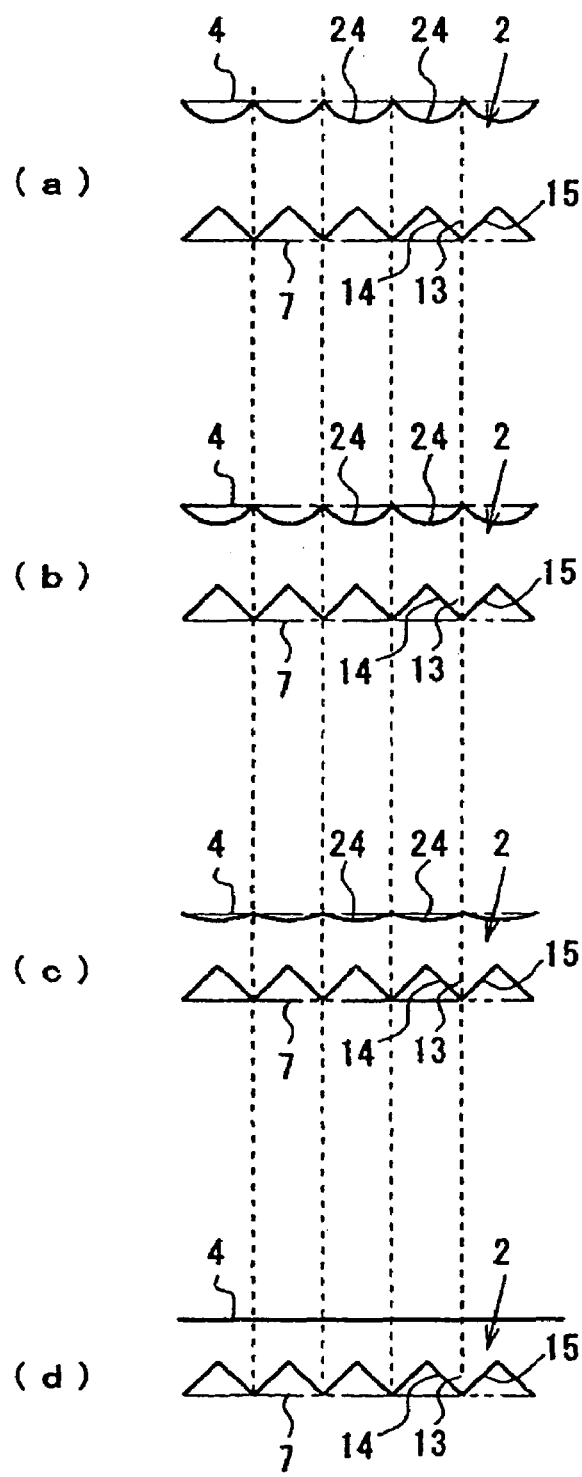
FIGS. 17a through 17d are enlarged cross section partial views along D1-D1, D2-D2, D3-D3 and D4-D4 in FIG. 16b, respectively.

FIGS. 12 and 13 show light guide plate 2 employed in LCD 1 of the second embodiment. FIG. 12 is a perspective outward appearance of light guide plate 12. FIG. 13 is a cross section view along B-B in FIG. 2. It is noted that parts commonly used in light guide plates 2 of the first and second embodiment are referenced by common numerals and repeated descriptions are omitted.

Light guide plate 2 in accordance with this embodiment has emission face 4 on which projections 16 composed of first and second slopes 17, 18 are formed within a "predetermined range" extending from incidence face 3.

The above a "predetermined range" is, for example, defined by L=20 T wherein T is plate-thickness at incidence face 3. This embodiment cane be utilized for controlling brightness balance on the whole area of emission face 4. For instance, this is suitable for image display modes requiring an increased brightness in the vicinity of an incidence face.

Third Embodiment

FIGS. 14 to 17 show light guide plate 2 of LCD 1 of in accordance with the present invention. FIG. 14 shows an outward appearance of light guide plate 2. FIG. 15 is a cross section view along C-C in FIG. 14, and FIGS. 16a, 16b are views for illustrating detailed configuration of light guide plate 2. FIGS. 17a to 17d illustrate cross section partial views along D1-D1, D 2-D2, D3-D3 and D4-D4 in FIG. 16b, respectively. It is noted that parts commonly used in light guide plates 2 of the first and this embodiment are referenced by common numerals and repeated descriptions are omitted.

Referring to the illustrations, prismatic grooves 24 are formed within a predetermined range (e.g. to L=20 T foresaid) extending from incidence face 3, on emission face 4 of light guide plate 2, as to run generally perpendicularly to incidence face 3, being arranged repeatedly in a direction parallel to incidence face 3.

Prismatic grooves 24 have arc-like cross sections parallel to incidence face 3. As shown in FIGS. 16a, 16b and 17a to 17d in detail, depth gets smaller with an increasing distance from incidence face 3 3, being equal to 0 at a predetermined distance L from incidence face 3.

Whole of the area on which no prismatic grooves 24 is formed provides an emission promotion surface. Projections 16 consisting of first and second slopes 17, 18 run in a direction generally perpendicular to a running direction of prismatic grooves 24.

Prismatic grooves 24 diffuse light gathered by prismatic projections 13 on back face 7, preventing bright lines (line-like abnormal emission portions), which are apt to appear in the vicinity of incidence face 3, from emerging. It is noted that bright lines tend to be generally parallel to incidence face 3.

In addition, a gradual decreasing depth of prismatic grooves 24 is preferable for diffusing depending on degree of tendency of appearance of bright lines and for avoiding excessive diffusion from occurring in a portion far from incidence face 3.

Effects of projections 16 consisting of first and second slopes 17, 18 have been described already. That is, light which acquired directivity through reflection at back face 7 is urged to emit almost without reducing directivity.

As a result, light guide plate 2 of this embodiment is able to not only suppress emerging of bright lines which would reduce illumination quality but also heighten emission brightness. This enable image display to be clear and bright.

Forth Embodiment

FIGS. 18a, 18b and 19a to 19d are views illustrating light guide plate 2 of a forth embodiment in accordance with the present invention. This embodiment corresponds to a modification of light guide plate 2 in the above third embodiment.

Figure 18:
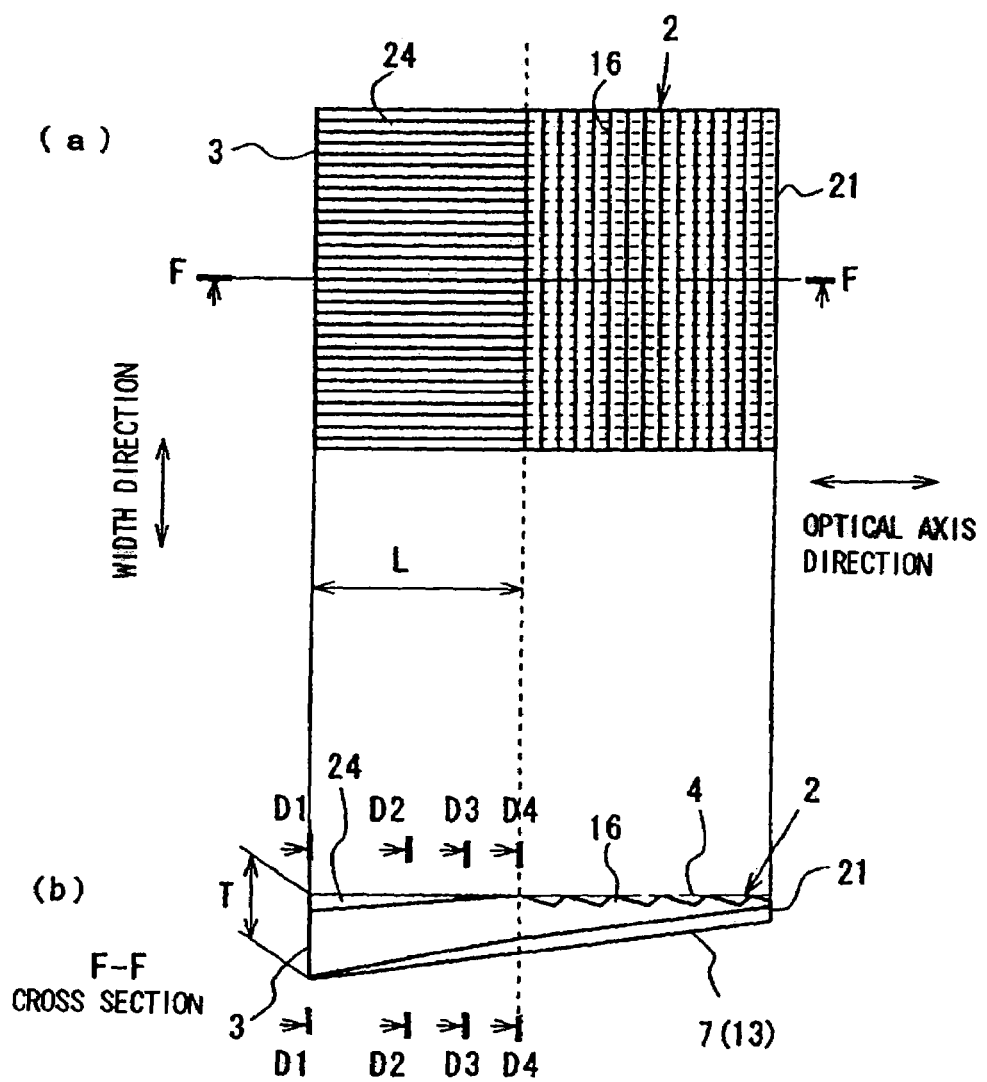

FIGS. 18a and 18b illustrate detailed configuration of an emission face side of light guide plate 2. FIG. 19a to 19d illustrate cross sectional configuration along D1-D1, D2-D2, D3-D3 and D4-D4 in FIG. 18b, respectively. It is noted that parts commonly used in light guide plates 2 of the first and this embodiment are referenced by common numerals and repeated descriptions are omitted.

Comparing light guide plate 2 of this embodiment with light guide plate 2 of the third embodiment, difference is that prismatic projections 13 on back face 7 are differently configurated in the vicinity of incidence face 3 (within a predetermined distance L from incidence face 3).

That is, in this embodiment, projection height gets smaller gradually toward incidence face 3 from a position generally the same as an ending position of prismatic grooves 24 (i.e. a position distant from incidence face 3 by predetermined distance L).

In addition, prismatic projections 13 have grooves 25 between adjacent prismatic projections 13 and configuration of grooves 25 changes from cross sections like triangles to cross sections like arcs smoothly, as shown from D4-D4 to D1-D1.

In addition, curvature radius of the arc-like configuration gets greater and depth of grooves 25 gets smaller accordingly.

Figure 19:
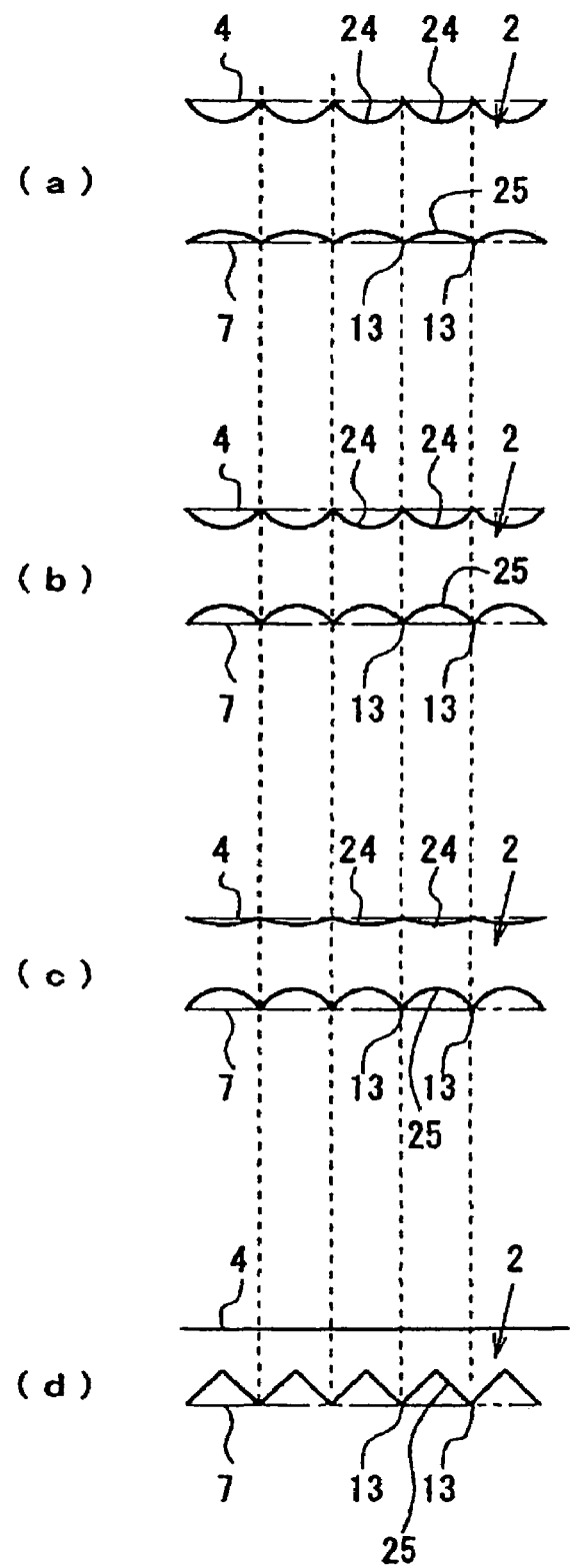
FIGS. 19a through 19d are enlarged cross section partial views along D1-D1, D2-D2, D3-D3 and D4-D4 in FIG. 18b, respectively.

It is noted that prismatic projections 13 formed in a range from the position distant from incidence face 3 by a predetermined distance L to distal end face 21 of light guide plate 2 have a constant height and configuration as shown in FIG. 19d.

In this embodiment, prism projections 13 formed in the vicinity of incidence face 3 have an emission promotion function decreasing with a decreasing distance from incidence face 3, and prismatic grooves 24 have a diffusion function in creasing with a decreasing distance from incidence face 3. As a result, suppression of bright lines which tend to appear in the vicinity of incidence face 3 is realized more effectively.

In addition, prismatic projections 13 formed in an area except the neighbour of incidence face 3 on back face 7 perform light gathering effects while projections 16 formed in an area except the neighbour of incidence face 3 on emission face 4 perform emission promoting effects. This enable image display to be clear and bright.

Fifth Embodiment

Figure 21:
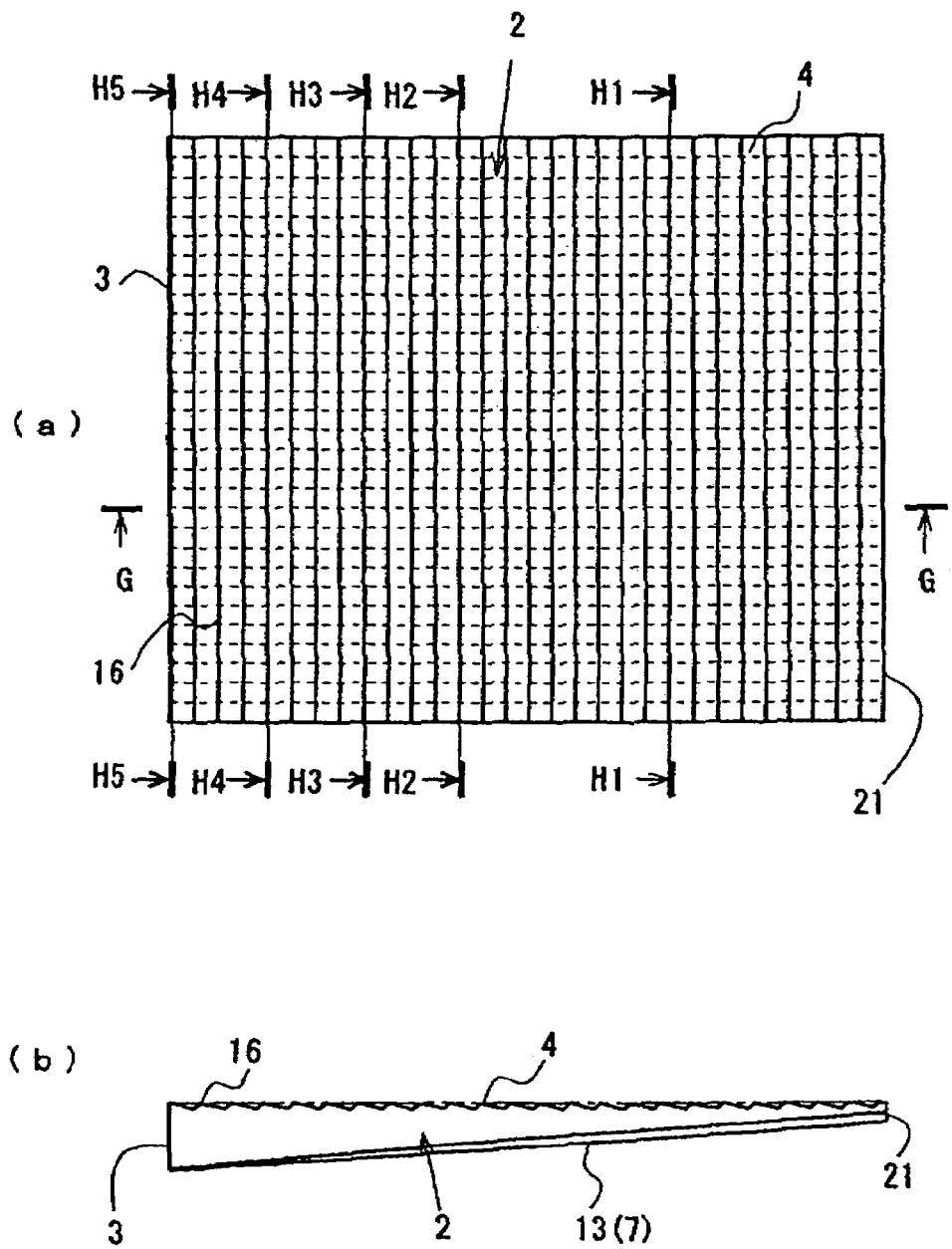
Figure 22:
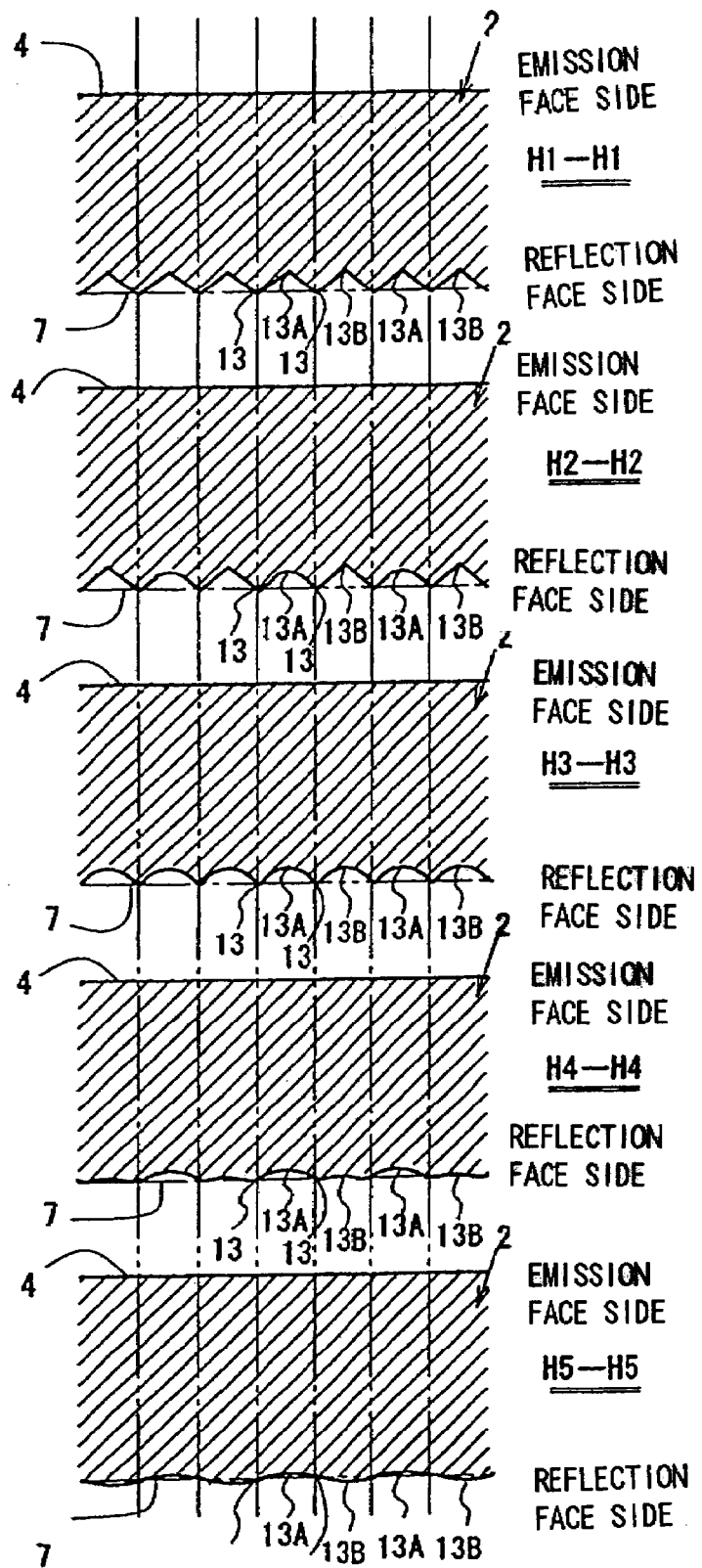
FIG. 22 show cross section views along H1-H1 through H5-H5 in FIG. 21a respectively.

FIGS. 21a, 21b and 22 are views illustrating light guide plate 2 of a fifth embodiment in accordance with the present invention. It is noted that parts commonly used in light guide plates 2 of the first and this embodiment are referenced by common numerals and repeated descriptions are omitted.

Referring to the illustrations, height of prismatic projections 13 in the vicinity of incidence face 3 on back face 7 decreases with a decreasing distance from incidence face 3. Grooves 13-A, 13-B between projections 13, 13 also change configuration with a decreasing distance from incidence face 3.

According to more detailed description, prismatic projections 13 have a generally constant height within a range from a generally middle position between incidence face 3 and distal end face 21 to distal end face 21 (See FIG. 21b and H1-H1 cross section shown in FIG. 22).

Then prismatic projections 13 decreases in height within a range from the generally middle position between incidence face 3 and distal end face 21 to the incidence face (See FIG. 21b and H2-H2 cross section shown in FIG. 22).

Two kinds of grooves 13A and 13B differently change in configuration, being formed alternately between projections 13, 13 (See FIG. 22). These two kinds of grooves 13A and 13B have generally constantly shaped triangle-like cross sections within the above range in which height is generally constant (See H1-H1 cross section).

Seeing two kinds of grooves 13A and 13B, in the first place, grooves 13A is formed as to have arc-like cross sections at a position (cross section position of H2-H2 shown in FIG. 22) that is slightly nearer to incidence face 3 than the middle position between incidence face 3 and distal end face 21, decreasing in groove depth from a position corresponding to H3-H3 to another position corresponding to H5-H5 (i.e. toward incidence face 3).

On the other hand, grooves 13B is formed as to have triangle-like cross sections (similar to those at the position corresponding to H1-H1) at a position (cross section position of H2-H2 shown in FIG. 22) that is slightly nearer to incidence face 3 than the middle position between incidence face 3 and distal end face 21.

In addition, grooves 13B is formed as to have arc-like cross sections generally the same as those of grooves 13A at the position corresponding to H3-H3. Grooves 13B decrease in depth more sharply as compared with adjacent grooves 13A, having arc-like cross sections with a depth smaller that of grooves 13A at a position of H4-H4.

Further to this, grooves 13B decrease gradually in depth with a decreasing distance from incidence face 3, and this depth decreasing ends at between H49H4 and H5-H5 (with a height the same as projection height of prismatic projections 13). Slightly projecting arc-like portions are formed at a cross section along H5-H5 (cross section roughly according with incidence face 3).

It is noted that slightly projecting arc-like portions are regarded as parts of grooves 13B for the sake of explanation in spite of being not grooves. Grooves 13A and grooves 13B are change their depth gently without involving changing of pitch between grooves.

Such light guide plate 2 is capable of effectively suppressing bright lines which tend to appear in the vicinity of incidence face 3 is because light gathering function by prismatic projections 13 gets weaker with a decreasing distance from incidence face 3.

In addition, if LED is employed as a light source, LED light can be easily spread in the vicinity of incidence face 3 where LED light tends to not spread. Therefore, dark portions brought by employment of LED is avoided and highly uniform illumination is realized.

Sixth Embodiment

Described hereafter is an image display (LCD) of the sixth embodiment in accordance with the present invention. The LCD is structured generally in the same way as LCD 1 of the first embodiment described above except structure of light guide plate 2. Accordingly, FIG. 1 is referred to again to illustrate an outlined structure.

Figure 23:
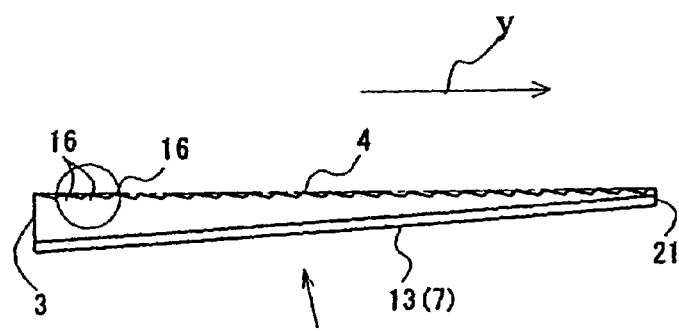
FIG. 23 is a cross section view of a light guide plate of a sixth embodiment in accordance with the present invention.
Figure 24:
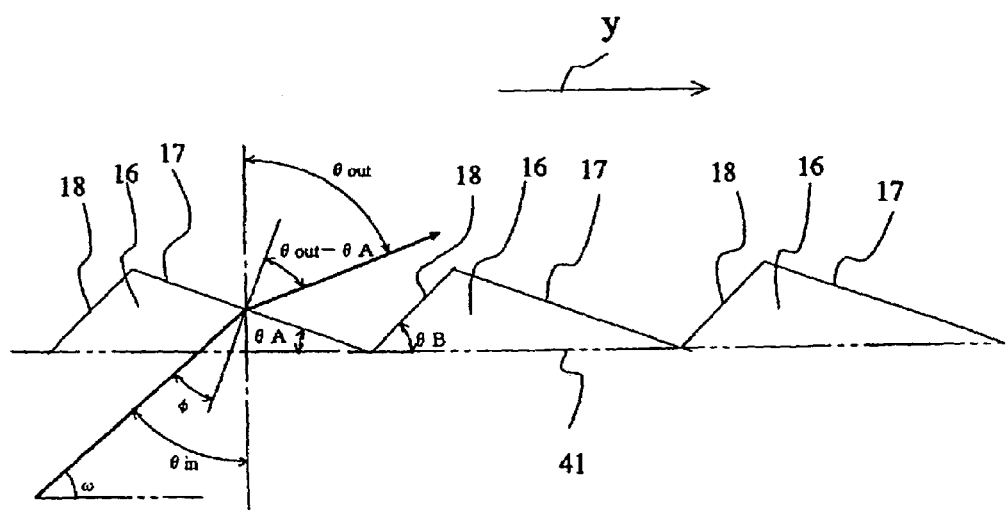
FIG. 24 gives an enlarged illustration of an encircled part in FIG. 23.

FIG. 23 is a cross section view of light guide plate 2 of this embodiment along a direction vertical to incidence face (incidence side end face) 3. FIG. 24 gives an enlarged illustration of an encircled part in FIG. 23 for illustrating configuration of an emission face of light guide plate 2.

(Outlined Structure of LCD)
(Outlined Structure of LCD)

Referring to FIG. 1, LCD 1 includes light guide plate 2, light control member (prism sheet) 5 disposed along emission face 4 of light guide plate 2, LCD panel (image display section) 6, reflection member 8 disposed along back face (a face opposite to emission face 4) 7 of light guide plate 2, light source (fluorescent lamp 10) disposed as to be opposite to incidence side end face 3 provided by a side end face 3 and reflector 11 disposed as to surround fluorescent lamp 10.

Light guide plate 2, prism sheet 5, reflection member 8, fluorescent lamp 10 and reflector 11 compose surface light source device 12 which backlights LCD panel 6. In this embodiment, LED (Light Emitting Diode) or light sources of other types may be also used instead of fluorescent lamp 10.

(Light Guide Plate)

Light guide plate 2 of this embodiment is made of a well light-permeable material as described in the first embodiment. An emission face is generally rectangular and back face 7 is inclined and plate thickness gets reduced with an increasing distance from incidence face 3, giving light guide plate 2 a wedge-like cross section.

Back face 7 is provided with prismatic projections 13 which run generally perpendicularly to incidence face 3 and are formed successively along a direction parallel to incidence face 3. Prismatic projections 13 have triangle-like cross sections parallel to incidence face 3, being provided with slopes 14 and 15 which are formed as to extend from top of triangle-like cross section and get remote from each other, functioning as a light gathering function surface.

That is, slopes 14 and 15 inner-reflect the light except for leaking light from back face 7, travelling within light guide plate 2 as to gather light around a normal direction of emission face 4 in a plane parallel to incidence face 3.

In this embodiment, an emission promotion surface id formed on emission face 4. Concretely, emission face 4 is provided with a plurality of projections 16 which run generally parallel to incidence face 3 and are formed successively along a direction perpendicular to incidence face 3. Projections 16 have triangle-like cross sections generally vertical to incidence face 3. Each projection 16 is formed of first slope 17 and second slope 18. First slopes 17 are inclined as to give a gently decreasing plate-thickness with an increasing distance from incidence face 3 while second slopes 18 are inclined inversely.

In other words, first and second slopes 17 and 18 are arranged alternately and repeatedly.

This repetition involves changing of inclination of first slopes 17. Concretely, angle θA decreases gradually along a direction from incidence face 3 to distal end face 21 (direction of arrow y shown by FIGS. 23 an 24). As shown in FIG. 24, angle θA is defined as inclination angle with respect to imaginary emission face 41 shown by double-dotted-line.

In other words, angle of first slope 17 with respect to imaginary emission face 41 gets larger with a decreasing distance from incidence face 3. It is noted that imaginary emission face 41 is a plane bridging valley lines of mutually adjacent projections 16, being parallel to emission face 4 defined in the first embodiment.

As described in the first embodiment, the light, except for leaking light from back face 7, travelling within light guide plate 2 as to leave incidence face 3 is inner-reflected by back face 7 (projections 13) and is directed to emission face 4. Remarkable part of this inner-reflected light is inner-incident to any first slope 17.

Inner-incidence occurs at smaller incidence with a decreasing distance from incidence face 3 because of the above gradual decreasing of angle θA, resulting in an increased emission efficiency. This effect enables, in cases where emission tendency to be poor in the vicinity of incidence face 3, this tendency to be suppressed and the whole of emission face to have a uniform emission brightness distribution.

In addition, under a constant pitch between projections 16, 16, the larger inclination angle θB of second slopes 18 is, the larger an area occupation ratio of first slopes 17 on emission face 4 becomes, with the result ratio of first slopes 17 show an increased emission promoting function.

In addition, second slopes 18 can function as emission promoting surfaces for "returning light" if inclination angle θB is set suitably. As previously described, "returning light" is light that returns toward incidence face 3 after being reflected by distal end face 21.

The above inclination angle θA of first slopes 17 falls preferably within a range from 0.1° to 5. Gradation of decreasing of inclination angle θA may be set under consideration of number or pitch of projections 16. The above inclination angle θB of second slopes 18 falls preferably within a range from 10° to 90°.

It has been described already that, if first and second slopes 17, 18 are arranged alternately and repeatedly, the sharper inclination of second slopes 18 is, the larger an area occupation ratio of first slopes 17 on emission face 4 becomes.

However, if inclination of second slopes 18 are steep excessively, dark regions can be generated around the highest portions of second slopes 18. Such phenomenon is preferably suppressed.

It is effective for suppressing such a phenomenon to consider a relation between a travelling direction of inner-travelling light corresponding to emission toward a main travelling direction from first slopes 17 and second slopes 18. Described below how to consider with referring to FIGS. 24, 25a and 25b.

In the first place, n, θA, θB, φ, θ in and θ out are defined as follows.

n: refractive index of light guide plate

θA: angle of first slope 17 with respect to imaginary emission face 41

θB: angle of second slope 18 with respect to imaginary emission face 41

θ out: angle of direction of the strongest emission from first slope 17 (i.e. main emission direction, called maine beam hereafter) with respect to imaginary emission face 41

ω: angle of travelling direction of inner-travelling light corresponding to the maine beam with respect to imaginary emission face 41

φ: angle of travelling direction of inner-travelling light corresponding to the maine beam with respect to a normal of first slope 17

θ in: angle of travelling direction of inner-travelling light corresponding to the maine beam with respect to a normal of imaginary emission face 41

The first formula (1) as below is established, provided that refractive index of air (the outside of light guide plate) is equal to 1 (Snell's Law).

$$n \sin \phi = \sin(\theta \text{ out} - \theta A) \quad (1)$$

Angle φ is expressed by the following formula (2).

$$\phi = \sin^{-1} \frac{\sin(\theta \text{ out} - \theta A)}{n} \quad (2)$$

Further, angle ω is expressed by the following formula (3).

$$\omega = 90 - (\phi + \theta A) \quad (3)$$

According to the above definition, angle of travelling direction of inner-travelling light corresponding to the main beam is expressed by ω and inclination angle of second slope 18 is expressed by angle θB.

Provided that both angles are equal to each other (θB=ω), light path of the main beam is generated at a position close to boundary between slope 17 and slope 18, as illustrated in FIG. 25a.

This means that this case allows main beam Q2 to exist in a manner such that main beam Q2 is extremely close and parallel to main beam Q1 that is emitted as to barely touch top portion 19A of triangular shape.

Under such condition, dark portions are hardly generated. It is noted that reference symbols P2 and P2 denote inner-travelling light corresponding to main beams Q1 and Q2, respectively, having travelling directions parallel to each other.

Dark portions are generated in a case as shown in FIG. 25b. Main beam Q4 exists adjacent to main beam Q3 emitted as to barely touch top portion 19B of triangular shape. However, a remarkable distance exists between main beams Q3 and Q4 because main beam Q4 is an inner-travelling light passing valley bottom 20 (See hatched portion). The greater angle θB is, the greater this distance.

Judging from the above discussion, a condition for avoiding dark portions from appearing is expressed by the following formula (4).

$$\theta B < \omega \quad (4)$$

This is rewritten as follows by means of formulas (2) and (3) to give the following formula (5).

$$\theta B < 90 - \sin^{-1} \frac{\sin(\theta \text{ out} - \theta A)}{n} - \theta A \quad (5)$$

If angle θB of second 18 with respect to imaginary emission face 4 is set so as to satisfy formula (5), light emitted toward a main emission direction from first slope 17 can avoid impinging to second slope 18. As a result, emerging if dark portions is supressed. A concrete example of calculated values is as follows.

n=1.49

θA=1°

θ out=70°

Substituting these values to the above formula (5), θB<about 50.2° is obtained.

In this case, a practical value of θB is θB=45°

General behaviour of light is roughly the same as that in the case of the first embodiment.

That is, an inner-travelling light of light guide plate 2 proceeds as to approach distal end face 21, involving repeated inner-reflections by emission face 4 and back face 7.

On the way of this inner-travelling, light that is inner-incident to first slope 17 at an incidence angle smaller that the critical angle escapes from light guide plate 2 directly.

Attention is to be paid to an important fact that angle θA of first slopes 17 with respect to imaginary emission face 41 gets greater with a decreasing distance from incidence face 3 and therefore emission occurs with ease accordingly.

Needless to say, inner-incidence to first slope 17 can be smaller than the critical angle more easily as compared with the imaginary case emission face 4 is flat (i.e. θA=0°) because first slopes 17 are inclined as to reduce plate thickness with an increasing distance from incidence face 3.

This brings a much promoted emission. In addition, light reflected by back face 7 is gathered around a normal direction of emission face 4 by prismatic projections 13 in a plane parallel to incidence face 3 and such directivity is not disturbed by being emitted from first emission face 17 formed uniformly on emission face 4 overall.

In addition, some of returning light produced by reflection at distal end face 21 is incident to second slope 18 at an incidence angle smaller than the critical angle, being emitted toward the outside of light guide plate 2. This emission from second slope 18 also avoids directivity of lightly gathered by prismatic projections 13 on back face 7 from being disturbed.

After all, emission promotion by slopes 17 and 18 do not disturb light-gathered state brought by prismatic projections 13. This gives a great advantage.

(Light Control Member and Reflection Member)

Prism sheet 5 as a light control member is structured and functions generally in the same way as compared with that employed in the first embodiment.

Emission from first slopes 17 has a main travelling direction of −70°, which is redirected to a generally normal direction by transmitting through prism sheet 5. It is noted that repetition detailed description is omitted.

The reflection member is also generally the same way as that employed in the first embodiment and repetition of detailed description is omitted.

(Results of Effect Measurement of Emission Promotion Surface)

Figure 26:
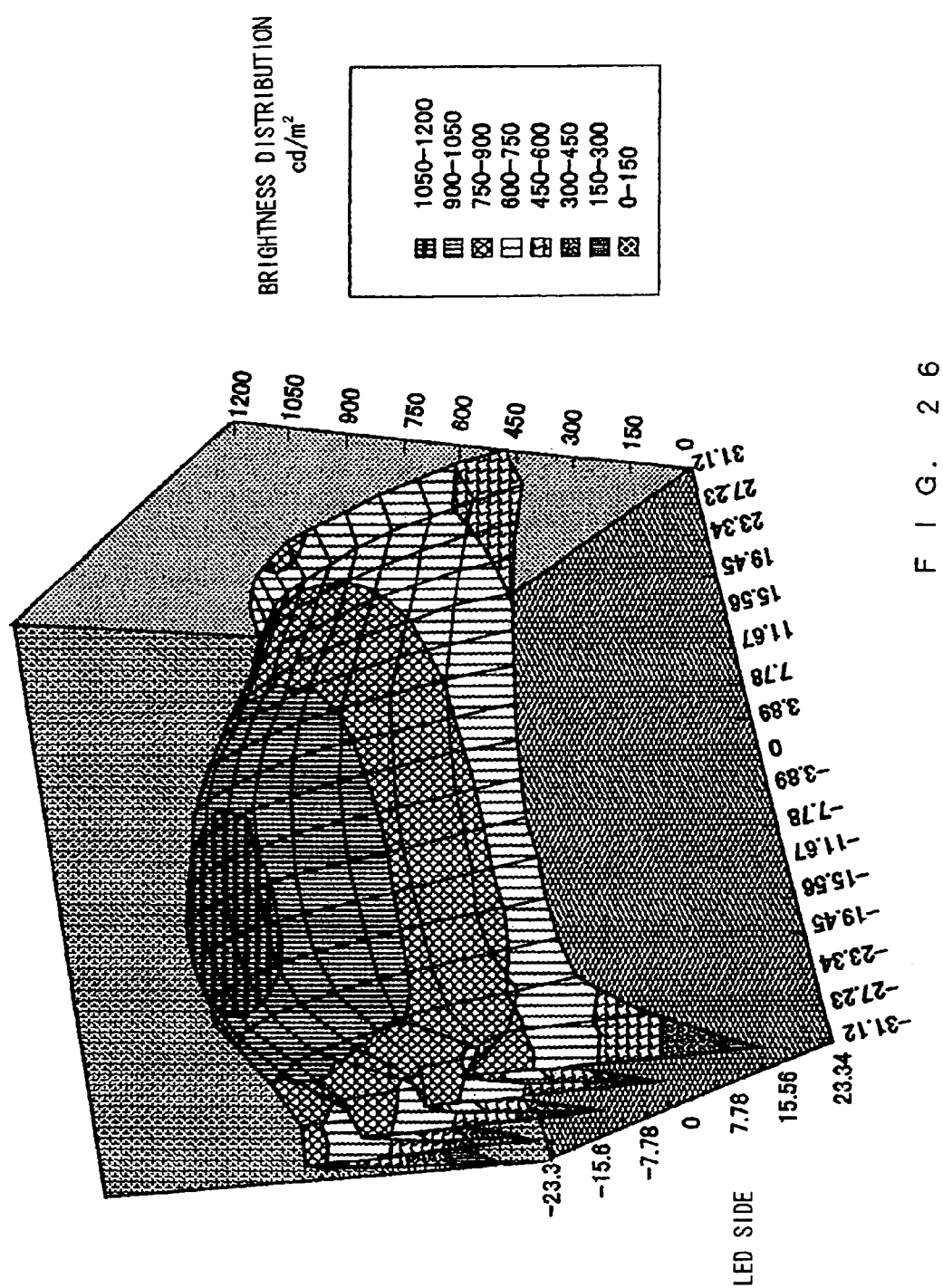
FIG. 26 is a graph illustrating three-dimensionally an emission brightness distribution obtained in a case where a LED light source was employed in the sixth embodiment and an emission side face of prism sheet was divided into six sections for each of which a brightness measurement result was obtained and illustrated three-dimensionally.

FIG. 26 shows emission brightness distribution of a surface light source device of this embodiment, with a LED used as light source. Emission brightness distribution is illustrated three-dimensionally according to measurement results of emission brightness in each of many areas defined by dividing an emission surface of prism sheet 5.

Orientation of prism sheet 5 is the same as that of the first embodiment (See FIGS. 8, 9 and related descriptions) That is, Prism sheet 5 was arranged so that a prismaric face was directed to emission face 4 and prismatic projections 13 ran perpendicularly to fine prismatic projections 22. Reflection member was disposed on the back face side of light guide plate 2.

Light guide plate 2 and prism sheet 5 were 46.6 mm in Width and 62.24 mm in depth. As for first slopes 17, projection 16 the nearest to incidence face 3 had an angle θA equal to 1.7°. From that position, angle θA of first slopes 17 decrease gradually toward distal end face 21 so that projection 16 the nearest to distal end face 21 had an angle θA equal to 0.1°.

Average brightness of the emission brightness distribution shown in FIG. 26 was 809.8 cd/mm$^2$.

FIG. 26 demonstrates that brightness is increased not only in the vicinity of incidence face 3 but also in generally whole area.

Figure 27:
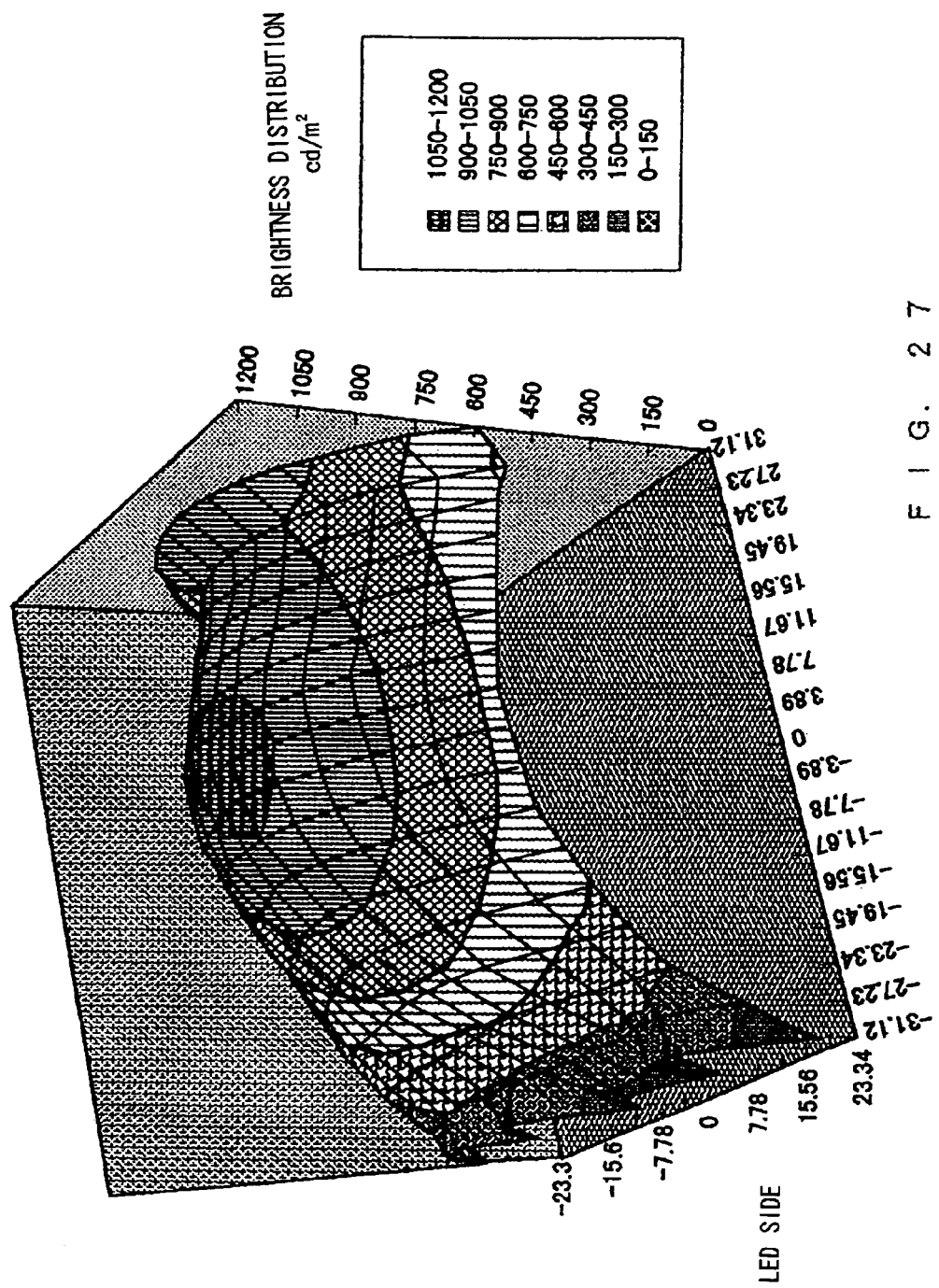
FIG. 27 is a graph illustrating three-dimensionally an emission brightness distribution obtained in a case where a LED light source was employed in the first embodiment and an emission side face of prism sheet was divided into six sections for each of which a brightness measurement result was obtained and illustrated three-dimensionally.

In the next place, FIG. 27 shows measurement results of emission brightness distribution of a surface light source device in accordance with the first embodiment under the same size condition as the above size condition, that is, light guide plate 2 and prism sheet 5 of 46.6 mm in Width and 62.24 mm in depth.

Figure 28:
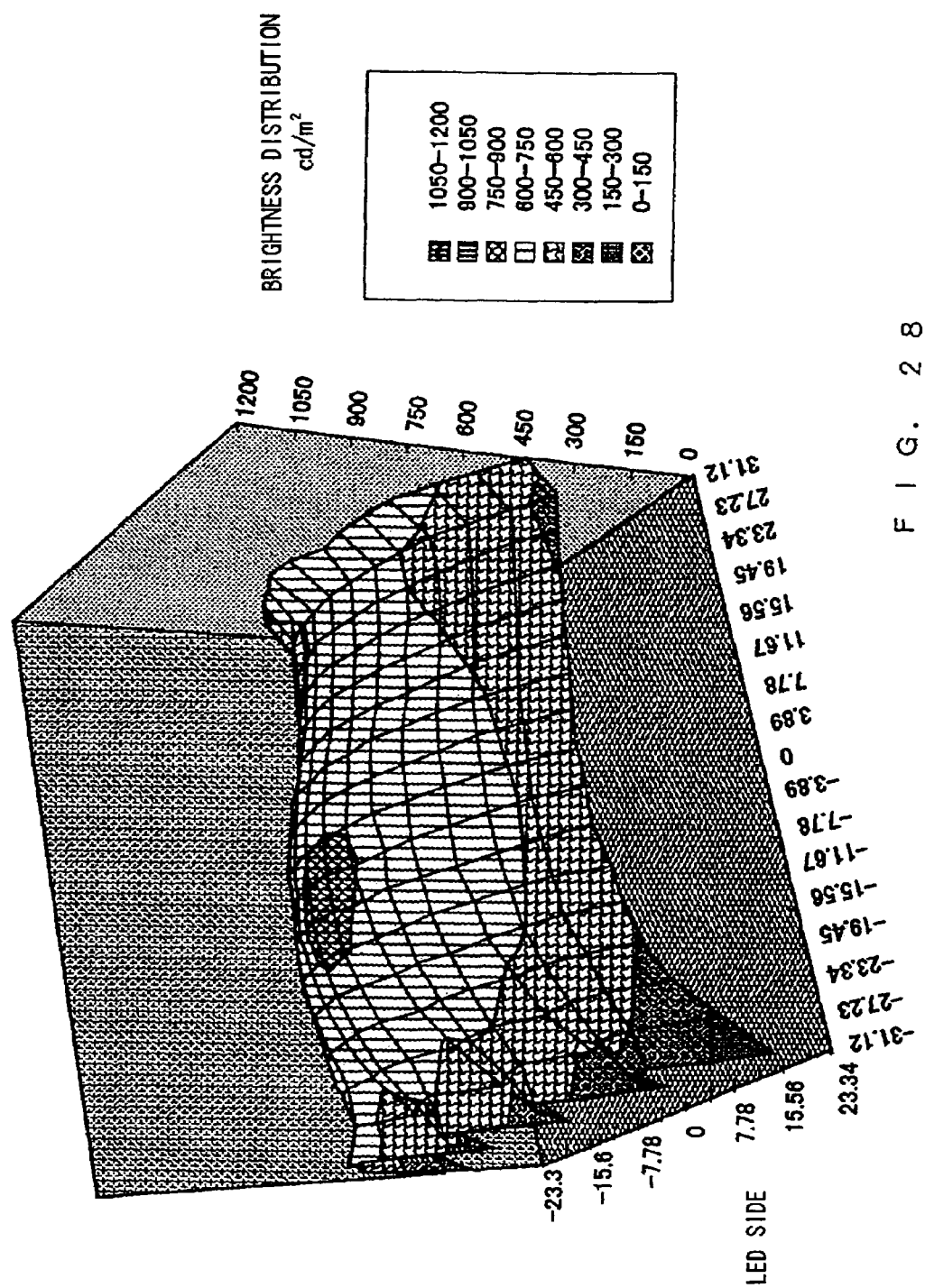
FIG. 28 is a graph illustrating an emission brightness distribution obtained for a surface light source device in which light-scattering-processing is applied to the emission face of the light guide plate employed in the first embodiment and an emission side face of a prism sheet was divided into six sections for each of which a brightness measurement result was obtained and illustrated three-dimensionally.

FIG. 28 shows an emission brightness distribution of a surface light source device referred in the first embodiment as Comparison Example in which light-scattering-processing is applied to an emission face of a light guide plate.

As illustrated in FIG. 28, general brightness reduction occurs in this Comparison Example. It is supposed that such general brightness reduction is caused by light-scattering-processing that spoiled emission directivity.

It is noted that matting for light-scattering may be applied to emission face 4 in the vicinity of incidence face 3 of light guide plate 2. This blurs bright lines which are apt to appear in the vicinity of incidence face 3.

Although backlighting of LCD panel is described in the above embodiments, this is merely exemplary. For instance, the present invention may be applied to backlighting of objects such as guide panels, character plates or advertising panels.

In surface light source device 12, light guide plate 2 may be arranged upside down as to emission face 4 and back face 7 are inversed. That is, light may be utilized for illumination in a way such that inner-travelling light of light guide plate 2 is emitted from emission face 4 and then reflected by reflection 8, and further transmits through light guide plate 2 to be utilized for for illumination.

This using way of light guide plate 2 is preferable in cases where uniform emission as a whole is preferentially desired, although involving brightness reduction.

In the above first to three embodiments, height of prismatic projections 13 on back face of light guide plate 2 may start decreasing toward incidence face 3 at a position distant from incidence face 3 by predetermined distance L. In this case, light gathering function gets weaker with a decreasing distance from incidence face 3.

In the above second to forth embodiments, predetermined distance L is set at 20 T. However, this is merely exemplary. For instance, predetermined distance L may be preferably set at the optimum distance depending on factors such as size of emission face 4 or kind of light source.

What is claimed is:

1. A light guide plate provided with an incidence side end face, a distal side face located oppositely to the incidence side end face, an emission face outputting light inputted from said incidence side end face and a back face located oppositely to the emission face, allowing the light inputted from said incidence side end face to be outputted from said emission face during traveling;

at least a part of said emission face providing an emission promotion surface which has a plurality of first slopes and a plurality of second slopes;

said first slopes being arranged repeatedly at intervals along a direction from said incidence side end face towards said distal side face;

said second slopes being arranged as to fill up the intervals respectively;

each of said first slopes being inclined as to have a normal leaning to the distal side face;

each of said second slopes being inclined as to have a normal leaning to the incidence side end face and to be steeper than adjacent first slopes on both sides thereof; and wherein inclination angles of said first slopes get smaller gradually with an increasing distance from said incidence side end face.

2. A light guide plate in accordance with claim 1, wherein inclination angles of said second slopes are defined so that light outputted toward a main direction of emission from said emission face avoids from being incident to said second slopes.

3. A light guide plate provided with an incidence side end face, a distal side face located oppositely to the incidence side end face, an emission face outputting light inputted from said incidence side end face and a back face located oppositely to the emission face, allowing the light inputted from said incidence side end face to be outputted from said emission face during traveling;

said back face providing a light gathering function surface which inner-reflects light as to gather the light around a normal direction of said emission face;

said emission face having emission promotion areas arranged repeatedly along a direction from said incidence side end face towards said distal side face;

said emission promotion areas having first and second slopes, respectively;

said first slopes being arranged repeatedly at intervals along a direction from said incidence side end face towards said distal side face and further being configurated as to give a gently decreasing thickness to the light guide plate with an increasing distance from said incidence side end face;

said second slopes being arranged as to fill up the intervals respectively and further being configured as to give a sharply increasing thickness to the light guide plate with an increasing distance from said incidence side end face.

4. A light guide plate in accordance with claim 3, wherein inclination angles of said second slopes are defined so that light outputted toward a main direction of emission from said emission face avoids from being incident to said second slopes.

5. A light guide plate in accordance with claim 3, wherein inclination angles of said fist slopes get smaller with an increasing distance from said incidence side end face.

6. A light guide plate in accordance with claim 3, wherein said emission promotion areas cover over said emission face.

7. A light guide plate in accordance with claim 3, wherein said emission promotion areas are formed within a predetermined range extending from said incidence side end face.

8. A light guide plate in accordance with claim 3, wherein said emission promotion areas are formed within a predetermined range extending from said incidence side end face; and
prismatic grooves extending in a direction generally perpendicular said incidence side end face are formed repeatedly along said incidence side end face.

9. A light guide plate in accordance with claim 3, wherein said light gathering function surface has a light gathering function which decreases with a decreasing distance from said incidence side end face within a neighbor of said incidence side end face.

10. A surface light source device, comprising;
a light guide plate in accordance with claim 1; and
a light source supplying light to the light guide plate through said incidence side end face.

11. A surface light source device, comprising;
a light guide plate in accordance with claim 3; and
a light source supplying light to the light guide plate through said incidence side end face.

12. An image display, comprising;
a surface light source device in accordance with claim 10; and
an image displaying portion supplied with light from said surface light source device.

13. An image display, comprising;
a surface light source device in accordance with claim 11; and
an image displaying portion supplied with light from said surface light source.

14. A light guide plate provided with an incidence side end face, a distal side face located oppositely to the incidence side end face, an emission face outputting light inputted from said incidence side end face and a back face located oppositely to the emission face, allowing the light inputted from said incidence side end face to be outputted from said emission face during traveling;

at least a part of said emission face providing an emission promotion surface which has a plurality of first slopes and a plurality of second slopes;

said first slopes being arranged repeatedly at intervals along a direction from said incidence side end face towards said distal side face;

said second slopes being arranged as to fill up the intervals respectively;

each of said first slopes being inclined as to have a normal leaning to the distal side face;

each of said second slopes being inclined as to have a normal leaning to the incidence side end face and to be steeper than adjacent first slopes on both sides thereof; and wherein inclination angles of said second slopes are defined so that light outputted toward a main direction of emission from said emission face avoids from being incident to said second slopes.

* * * * *